(12) United States Patent
Kim et al.

(10) Patent No.: US 7,206,353 B2
(45) Date of Patent: Apr. 17, 2007

(54) MOBILE COMMUNICATION APPARATUS INCLUDING AN ANTENNA ARRAY AND MOBILE COMMUNICATION METHOD

(75) Inventors: Sung-Jin Kim, Suwon (KR); Ki-Ho Kim, Seoul (KR); Hyeon-Woo Lee, Suwon (KR); Yong-Suk Lee, Yongin (KR); Jong-Hyeuk Lee, Incheon (KR); Yung-Soo Kim, Seongnam (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 873 days.

(21) Appl. No.: 10/225,420

(22) Filed: Aug. 22, 2002

(65) Prior Publication Data

US 2003/0043946 A1      Mar. 6, 2003

(30) Foreign Application Priority Data

Aug. 25, 2001   (KR)   ................ 10-2001-0051590

(51) Int. Cl.
*H04L 7/02*   (2006.01)
*H04L 27/36*   (2006.01)
*H04B 7/02*   (2006.01)
*H04B 7/08*   (2006.01)

(52) U.S. Cl. ............... 375/267; 375/358; 375/299; 375/347; 455/101; 455/132

(58) Field of Classification Search ........... 375/358, 375/130, 147, 267, 347, 140–144, 146, 148, 375/150, 299; 455/65, 101, 132
See application file for complete search history.

(56) References Cited

U.S. PATENT DOCUMENTS 5,999,826 A     12/1999  Whinnett (Continued)

FOREIGN PATENT DOCUMENTS

EP          0905920          3/1999

(Continued)

OTHER PUBLICATIONS

Brunner et al., Space-Time Elgenrake and Dowlink Elgenbeamformer, etc . . . , 2000, IEEE, pp. 138-142.

(Continued)

*Primary Examiner*—Tesfaldet Bocure
(74) *Attorney, Agent, or Firm*—Lee & Morse, P.C.

(57) ABSTRACT

A mobile communication apparatus having an antenna array and a mobile communication method performed in the mobile communication apparatus, wherein the mobile communication apparatus includes a base station and mobile station, each having an antenna array. The mobile station measures the downlink characteristics of a channel for each antenna from a signal received from a base station, determines long-term information in which the correlation property of the channel for each antenna has been reflected from the measured downlink characteristics, transforms the long-term information into a feedback signal, and transmits the feedback signal to the base station. The base station receives the feedback signal, restores the long-term information from the received feedback signal, performs basis mapping and basis transformation on a dedicated physical channel signal using the restored long-term information, adds the basis-mapped and basis-transformed signal to each of pilot channel signals, and transmits the addition results to the mobile station.

27 Claims, 15 Drawing Sheets

U.S. PATENT DOCUMENTS

| | | | |
|---|---|---|---|
| 6,167,039 A * | 12/2000 | Karlsson et al. | 370/342 |
| 6,567,462 B1 * | 5/2003 | Brunner et al. | 375/148 |
| 6,754,473 B1 * | 6/2004 | Choi et al. | 455/101 |
| 6,831,943 B1 * | 12/2004 | Dabak et al. | 375/147 |
| 6,839,326 B1 * | 1/2005 | Pajukoski et al. | 370/252 |
| 6,961,545 B2 * | 11/2005 | Tehrani et al. | 455/101 |
| 2001/0031647 A1 * | 10/2001 | Scherzer et al. | 455/562 |
| 2002/0019235 A1 * | 2/2002 | Kim et al. | 455/451 |
| 2002/0186779 A1 * | 12/2002 | Gollamudi | 375/267 |
| 2003/0003873 A1 * | 1/2003 | Raghothaman | 455/67.1 |
| 2003/0017835 A1 * | 1/2003 | Bergel | 455/502 |
| 2003/0035490 A1 * | 2/2003 | Gollamudi | 375/267 |

FOREIGN PATENT DOCUMENTS

| | | |
|---|---|---|
| EP | 1 156 596 | 11/2001 |
| EP | 001191755 A2 * | 3/2002 |
| JP | 10-117162 | 5/1998 |
| JP | 10-190537 | 7/1998 |
| JP | 2001-168777 | 6/2001 |
| WO | 98/09381 | 3/1998 |
| WO | 01/45300 | 6/2001 |
| WO | 01/76110 | 10/2001 |
| WO | 02/47286 | 6/2002 |

OTHER PUBLICATIONS

Siemans, 3GPP TSG RAN WG 1, Meeting #14, Jul. 2000, "Advanced Closed Loop TxDiversity Concept", pp. 1-12.

3GPP TS 25.214.2 DRAFT, Sep. 2000, "Closed Loop Mode Transmit Diversity", pp. 43-51

G. Golub, et al.—, Matrix Computations, 1996, "The Unsymmetric Elgenvalue Problem"; pp. 208-211.

G. Golub, et al.—Matrix Computations, 1996, "Vectors, Matrices, Subspaces, etc..", pp. 16-21.

G.D. Golden, et al.—Electronics Letters, Jan. 7, 1999, "Detection Algorithm, etc..", vol. 35 No. 1 pp. 14-16.

J.G. Proakls, Digital Communications, 1995, "Convolutional Codes", 3$^{rd}$ edition, chapter 8, pp. 470-477.

* cited by examiner

MOBILE COMMUNICATION APPARATUS INCLUDING AN ANTENNA ARRAY AND MOBILE COMMUNICATION METHOD

BACKGROUND OF THE INVENTION

1. Field of the Invention

The present invention relates to the field of mobile communications. More particularly, the present invention relates to a mobile communication apparatus including an antenna array, wherein the mobile communication apparatus is capable of minimizing the effect of fading, interference and noise, and a mobile communication method used in the mobile communication apparatus.

2. Description of the Related Art

A next-generation mobile communication system can transmit information faster than a current PCS mobile communication system. Europe and Japan have adopted a wideband code division multiple access (W-CDMA) system, which is an asynchronous system, as a wireless access standard, while North America has adopted a CDMA-2000 (multi-carrier code division multiple access) system, which is a synchronous system.

In a conventional mobile communication system, several mobile stations communicate with one another through a base station. In order to transmit information at a high rate of speed, a mobile communication system should minimize loss due to characteristics of a mobile communication channel, such as fading and user interference. Diversity systems are used to prevent communication from becoming unstable due to fading. For example, a space diversity system, which is a type of diversity system, uses multiple antennas.

Since the use of multiple antennas can minimize the interference between users, a next-generation mobile communication system should use multiple antennas. Among diversity systems that overcome fading using multiple antennas, a multiple transmitting antenna system, used to increase the capacity of a transmission terminal, requires significant bandwidth in a transmission direction in view of the characteristics of next-generation mobile communication.

In order to achieve fast information transmission, a conventional mobile communication system should overcome fading, which is one of the channel characteristics having the most serious effect on communication performance, because fading reduces the amplitude of a received signal by several dB or several tens of dB. Fading can be overcome by several diversity techniques. A conventional CDMA technique adopts a rake receiver for receiving diverse signals using the delay spread of a channel. A rake receiver performs a diversity reception technique for receiving a multi-path signal. However, the diversity reception technique does not operate when a delay spread is low.

A time diversity system using interleaving and coding is used in a Doppler spread channel. The time diversity system, however, is not suitable for a low-speed Doppler channel. In a room channel with a high delay spread and a pedestrian channel corresponding to a low Doppler channel, a space diversity system is used to overcome fading. A space diversity system uses at least two antennas. If a signal received via one antenna is attenuated by fading, the space diversity system receives the signal via another antenna. The space diversity system is classified into a reception antenna diversity system using a reception antenna and a transmission antenna diversity system using a transmission antenna. As it is difficult for a mobile station to install the reception antenna diversity system in view of size and costs, it is recommended that a base station use the transmission antenna diversity system.

In the transmission antenna diversity system, there are a closed loop transmission diversity system getting feedback of a downlink channel information from a mobile station to the base station and an open loop transmission diversity system getting no feedback from a mobile station to the base station. In the transmission antenna diversity system, a mobile station searches for an optimal weighted value by measuring the phase and magnitude of a channel. In order to measure the phase and magnitude of a channel, a base station must send different pilot signals for different antennas. A mobile station measures the magnitude and phase of a channel through the pilot signals and searches for an optimal weighted value from the measured channel magnitude and phase information.

Additionally, in the transmission antenna diversity system, if the number of antennas increases, the diversity effect and the signal-to-noise ratio improve. However, the amount of improvement in the diversity effect decreases with an increase in the number of antennas or signal transmission paths used in a base station, that is, with an increase in the degree of diversity. Accordingly, to improve the diversity effect by using a number of antennas is not always preferable. Hence, it is preferable that the number of antennas used in a base station increases to minimize the power of an interference signal and maximize the signal-to-noise ratio of an internal signal, instead of improving the diversity effect.

A transmission adaptive antenna array system developed in consideration of a beamforming effect that minimizes the influence that interference and noise, as well as diversity effect, have upon an internal signal is referred to as a downlink beamforming system. A system using feedback information like a transmission diversity system is referred to as a closed loop downlink beamforming system. The closed loop downlink beamforming system, which uses information fed back from a mobile station to a base station, may degrade the performance of communications by failing to properly reflect changes in channel information if a feedback channel does not have a sufficient bandwidth.

European IMT-2000 standardization group, a 3rd Generation Partnership Project (3GPP) R (Release) 99 version, adopts first and second transmission antenna array (TxAA) modes as a closed loop transmission diversity system for two antennas. Here, the first TxAA mode, which has been proposed by Nokia, feeds only the phase difference between two antennas back. The second TxAA mode, which has been proposed by Motorola, feeds the gains of two antennas as well as their phases back. The first and second TxAA modes are disclosed in the specification set by the 3GPP, a standardization group for a Universal Mobile Telecommunications System (UMTS), which is a European IMT-2000 standard.

The first or second TxAA mode of a closed loop transmission diversity system uses adaptive array antennas and is designed to apply weighted values corresponding to different complex values to the respective adaptive transmission array antennas. The weighted values applied to the adaptive array antennas relate to a transmission channel and can be, for example, w=h* (w and h are vectors). Hereinafter, bold characters indicate vectors, and non-bold characters indicate scalars. Here, h denotes a transmission array channel and w denotes a transmission array antenna weighted value vector.

Among mobile communication systems, a system using a frequency division duplex (FDD) generally has a transmission channel and a reception channel that have different characteristics from each other, and accordingly must feed transmission channel information back in order to inform a base station of the transmission channel h. To do this, the first or second TxAA mode is designed so that a mobile station obtains the information on the weighted value w to be obtained from the channel information on the channel h and sends the obtained weighted value information to the base station. The first TxAA mode quantizes only a $\theta_2-\theta_1$ part corresponding to a phase component from the information on the weighted value w $(=|w_1|\exp(j\theta_1), |w_2|\exp(j\theta_2))]$, where $w_1$ and $w_2$ denotes scalars) into two bits and feeds the two bits back. Accordingly, the precision of a phase is $\pi/2$, and a quantization error is $\pi/4$ at the maximum. In order to increase the efficiency of the feedback, the first TxAA mode uses a refining method of updating only one bit out of two feedback bits every moment. For example, a combination of two bits can be $\{b(2k), b(2k-1)\}$ or $\{b(2k), b(2k+1)\}$, where b denotes a bit fed back in units of slots every moment. The second TxAA mode feeds back both a phase and a gain, which are the components of the weighted value information. The phase is fed back three (3) bits at a time, and the gain is fed back one (1) bit at a time. Accordingly, the precision of the phase is $\pi/4$ and a quantization error is $\pi/8$ at the maximum. In order to increase the efficiency of the feedback, the second TxAA mode uses a progressive refining mode for updating only one bit out of the four feedback bits every moment. A refining mode provides each bit having an orthogonal basis value, while the progressive refining mode does not set the value of each bit.

The above-described first and second TxAA modes have the following problems when the number of antennas and the characteristics of a space-time channel vary.

If the number of antennas increases, a weighted value for each antenna must be fed back, and hence a significant amount of information to be fed back is created. Thus, depending on the movement speed of a mobile station, the first and second TxAA modes degrade the communication performance. That is, generally, if the movement speed of a mobile station increases in a fading channel, a change in the space-time channel becomes of considerable concern. Thus, the feedback speed of channel information must increase. However, if the feedback speed is limited, feedback information increasing with an increase in the number of antennas consequently degrades the performance of communications.

If the distance between antennas is not sufficient, the correlation between channels in each antenna increases. If the correlation between channels increases, the information amount of a channel matrix decreases. The effective use of a feedback method prevents performance degradation in a high-speed moving body environment even if the number of antennas increases. However, since the first and second TxAA modes are constructed under the assumption that the channels of two antennas that constitute the space-time channels are completely independent from each other, they cannot be used effectively when the number of antennas and the characteristics of the space-time channel change. In addition, the first and second TxAA modes have never been applied to an environment using more than 2 antennas and cannot provide excellent performance even when using 3 or more antennas.

SUMMARY OF THE INVENTION

In an effort to solve the above-described problems, it is a feature of an embodiment of the present invention to provide a mobile communication apparatus having a base station and mobile stations that each include an antenna array, in which information having the downlink characteristics of a space channel for every antenna that exists between the mobile stations and the base station is fed back from the mobile stations to the base station, minimizing the effects of fading, interference, and noise and maximizing throughput.

Another feature of an embodiment of the present invention is to provide a mobile communication method performed in the mobile communication apparatus having a base station and mobile stations that each include an antenna array.

In the mobile communication apparatus according to an embodiment of the present invention, each of the mobile stations measures the downlink characteristics of a channel for each antenna from a signal received from a base station, determines long-term information in which the correlation property of the channel for each antenna has been reflected from the measured downlink characteristics, transforms the long-term information into a feedback signal, and transmits the feedback signal to the base station. The base station receives the feedback signal from the mobile station, restores the long-term information from the received feedback signal, performs basis mapping and basis transformation on a dedicated physical channel signal using the restored long-term information, adds the basis-mapped and basis-transformed signal to each of a plurality of pilot channel signals, and transmits the addition results to the mobile station.

The mobile communication method performed in the mobile communication apparatus according to the present invention includes two steps. In the first step, the downlink characteristics of a channel for each antenna are measured from a signal received from the base station, long-term information in which the correlation property of the channel for each antenna has been reflected is determined from the measured downlink characteristics, the long-term information is transformed into a feedback signal, the feedback signal is transmitted to the base station. In the second step, the feedback signal is received from the first step, the long-term information is restored from the received feedback signal, basis mapping and basis transformation are performed on a dedicated physical channel signal using the restored long-term information, the basis-mapped and basis-transformed signal is added to each of a plurality of pilot channel signals, the addition results are transmitted to the mobile station.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Korean Patent Application No. 2001-51590, filed Aug. 25, 2001, and entitled: "Mobile Communication Apparatus Including Antenna Array and Mobile Communication Method," is incorporated by reference herein in its entirety.

Figure 1:
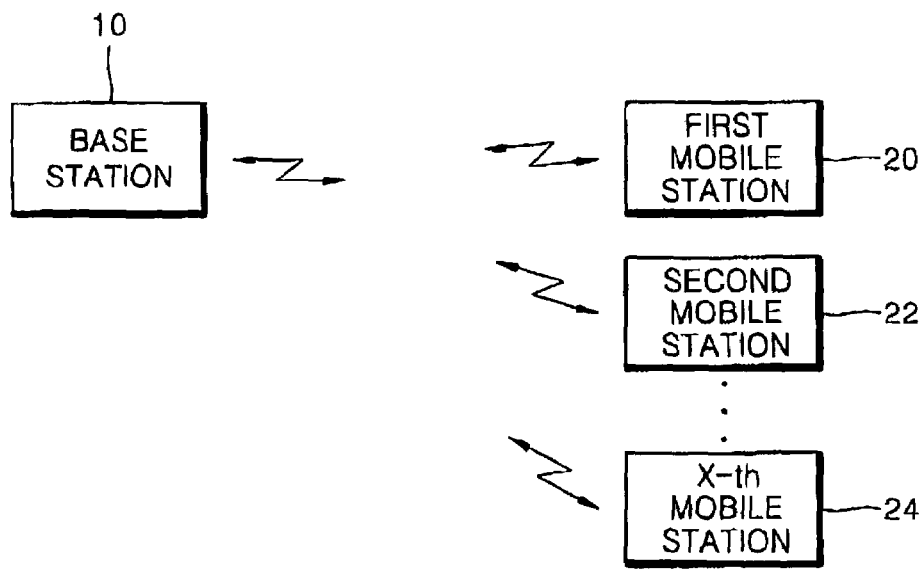
FIG. 1 is a schematic block diagram of a mobile communication apparatus including an antenna array, according to an embodiment of the present invention.

Referring to FIG. 1, a mobile communication apparatus including an antenna array, according to an embodiment of the present invention, includes a base station 10 and first, second, . . . , and X-th mobile stations 20, 22, . . . , and 24.

Figure 2:
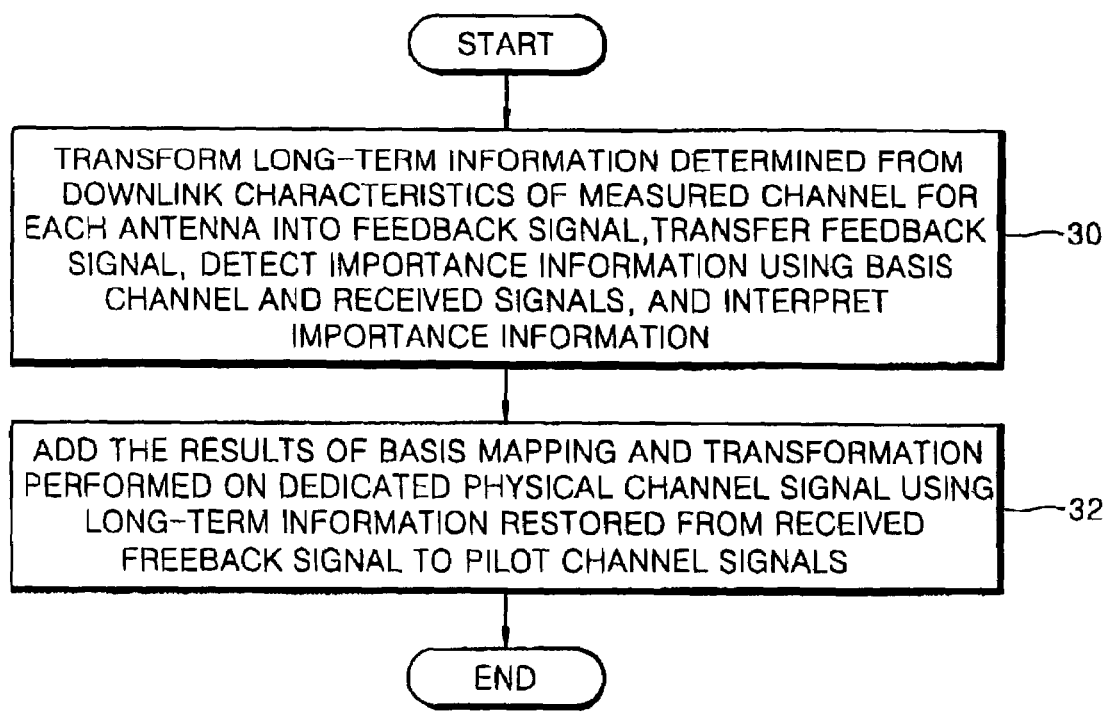
FIG. 2 is a flowchart for illustrating a mobile communication method according to an embodiment of the present invention, performed in the mobile communication apparatus of FIG. 1.

FIG. 2 is a flowchart for illustrating a mobile communication method according to an embodiment of the present invention, performed in the mobile communication apparatus of FIG. 1. This mobile communication method includes a step 30 of obtaining a feedback signal and a step 32 of restoring long-term information from the feedback signal and utilizing the restored long-term information.

The first, second, . . . , and X-th mobile stations 20, 22, . . . , and 24 of FIG. 1 perform the same function and each have an antenna array. For example, the first, second, . . . , and X-th mobile stations 20, 22, . . . , and 24 correspond to terminals. The base station 10 also has an antenna array. In step 30 of FIG. 2, each of the first, second, . . . , and X-th mobile stations 20, 22, . . . , and 24 measures the downlink characteristics H of a channel for each of the antennas of the antenna array included in the base station 10 from a signal received from the base station 10. Each mobile station also determines long-term information in which the correlation between channels for respective antennas is reflected, from the measured downlink characteristics H of a channel, transforms the determined long-term information into a feedback signal, and transfers the feedback signal to the base station 10. In addition, each mobile station interprets the information received from the base station 10, using importance information detected using a basis channel produced from the downlink characteristics H and received signals. Here, effective basis information denotes effective basis vectors and effective basis values.

An embodiment of step 30 and an embodiment of each of the mobile stations 20, 22, . . . , and 24 will now be described with reference to FIGS. 3 and 4.

Figure 3:
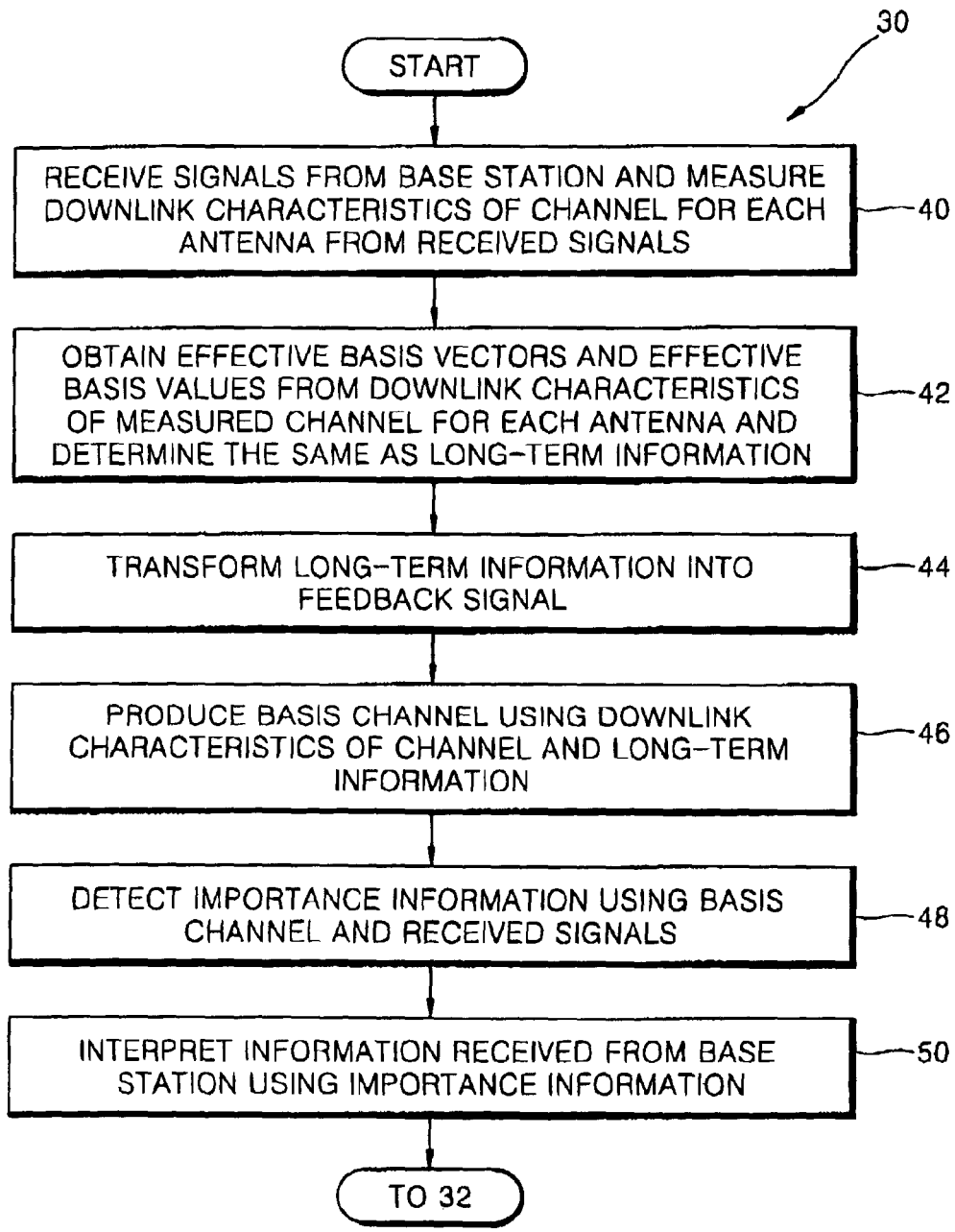
FIG. 3 is a flowchart for illustrating a preferred embodiment of step 30 of FIG. 2.

FIG. 3 is a flowchart for illustrating a preferred embodiment of step 30 of FIG. 2, according to the present invention. First, in step 40, the downlink characteristics H of a channel are measured. In step 42, effective basis vectors and effective basis values, which are the long-term information of a channel, are obtained from the measured downlink characteristics H. In step 44, the determined long-term information is transformed into a feedback signal. In steps 46 and 48, importance information is detected using a produced basis channel and received signals. In step 50, transmitted information is interpreted using the importance information.

Figure 4:
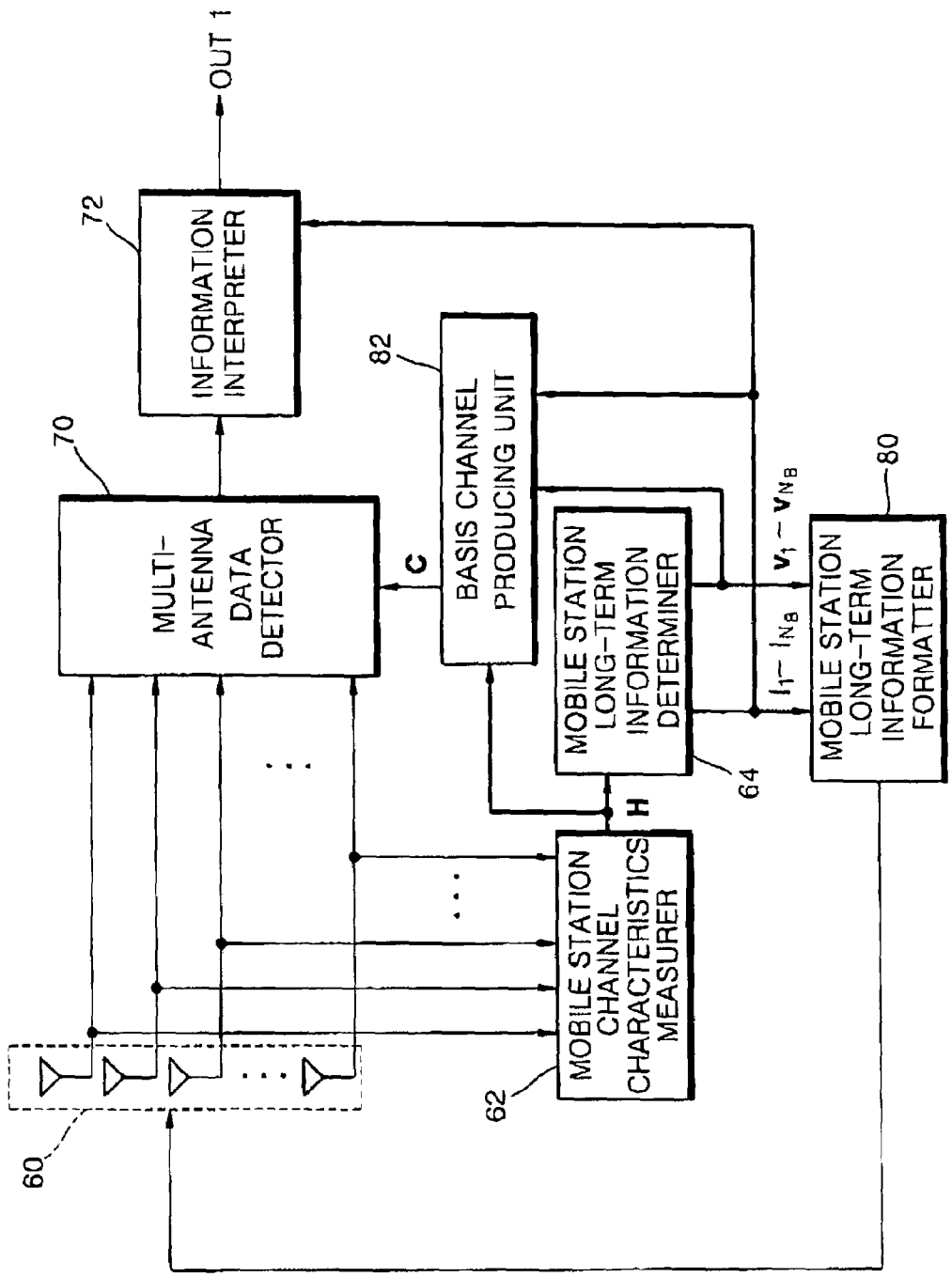
FIG. 4 illustrates a block diagram of a preferred embodiment of the first, second, . . . , or X-th mobile station of FIG. 1.

FIG. 4 is a block diagram of a preferred embodiment of the first, second, . . . , or X-th mobile station 20, 22, . . . , or 24 of FIG. 1. A mobile station 20, 22, . . . , or 24 includes an antenna array 60, a mobile station channel characteristics measurer 62, a mobile station long-term information determiner 64, a mobile station long-term information formatter 80, a basis channel producing unit 82, a multi-antenna data detector 70, and a information interpreter 72. Here, a dark line connecting units indicates a plurality of signals, and a light line connecting units indicates a single signal.

Referring to FIGS. 3 and 4, in step 40, the mobile station channel characteristics measurer 62 receives signals from the base station 10 through the antenna array 60, measures the downlink characteristics H of a channel for each antenna from the received signals, and outputs the measured downlink characteristics H of the channel to each of the mobile station long-term information determiner 64 and the basis channel producing unit 82. Here, H denotes a matrix. Hereinafter, bold characters denote vectors, and non-bold characters denote scalars. The downlink characteristics H of a channel denotes the phase and magnitude of a channel transferred from the base station 10 to a mobile station 20, 22, . . . , or 24. In the channel downlink characteristics H, columns are constituted with channels formed by transmission antennas, and rows are constituted with channels formed by reception antennas. Here, the transmission antennas denote the antennas of an antenna array included in the base station 10, and the reception antennas denote the antennas of an antenna array included in each of the mobile stations 20, 22, . . . , and 24.

After step 40, in step 42, the mobile station long-term information determiner 64 produces basis vectors and basis values from the channel downlink characteristics H spatially measured by the mobile station channel characteristics measurer 62, calculates the number of effective vectors, $N_B$, (hereinafter referred to as an effective basis number) out of the basis vectors using the basis values, and determines effective basis vectors $v_1$ through $v_{N_B}$, the number of which corresponds to the effective basis number $N_B$, and effective basis values $I_1$ through $I_{N_B}$, the number of which corresponds to the effective basis number $N_B$, as effective basis information, that is, long-term information. Here, the effective basis number is equal to or less than the number of antennas included in an antenna array of the base station 10. The column components of the matrix H are obtained with respect to the space formed by transmission antennas, and the row components are obtained with respect to the space formed by reception antennas.

An embodiment of step 42 of FIG. 3 and an embodiment of the mobile station long-term information determiner 64 of FIG. 4 will now be described with reference to FIGS. 5 and 6, respectively.

Figure 5:
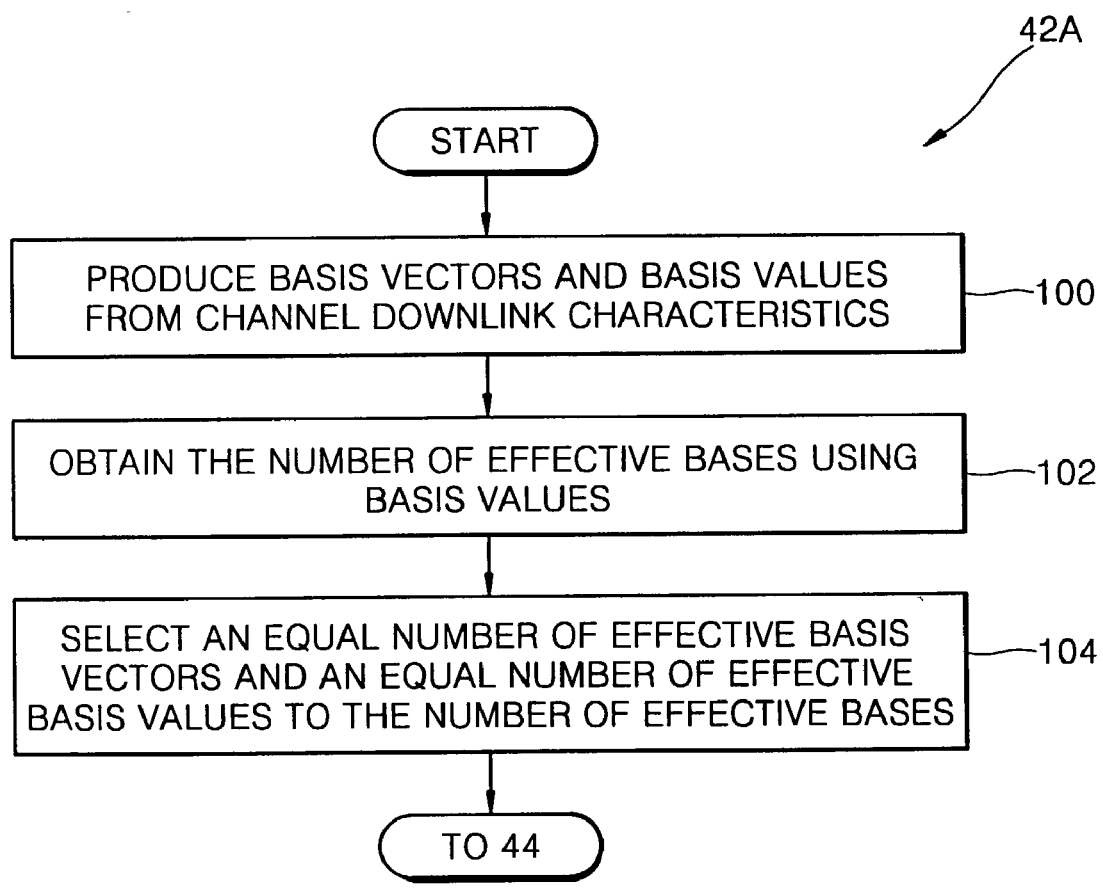
FIG. 5 is a flowchart for illustrating a preferred embodiment of step 42 of FIG. 3.

FIG. 5 is a flowchart for illustrating step 42A, which is an embodiment of step 42 of FIG. 3. First, in step 100, basis vectors $v_1$ through $v_{antT}$ and basis values $I_1$ through $I_{antT}$ are produced. Here, antT denotes the number of transmission antennas. Next, in step 102, the effective basis number $N_B$ is obtained using the basis values $I_1$ through $I_{antT}$. Thereafter, in step 104, an equal number of effective basis vectors $v_1$ through $v_{N_B}$ to the effective basis number $N_B$ and an equal number of effective basis values $I_1$ through $I_{N_B}$ to the effective basis number $N_B$ are obtained.

Figure 6:
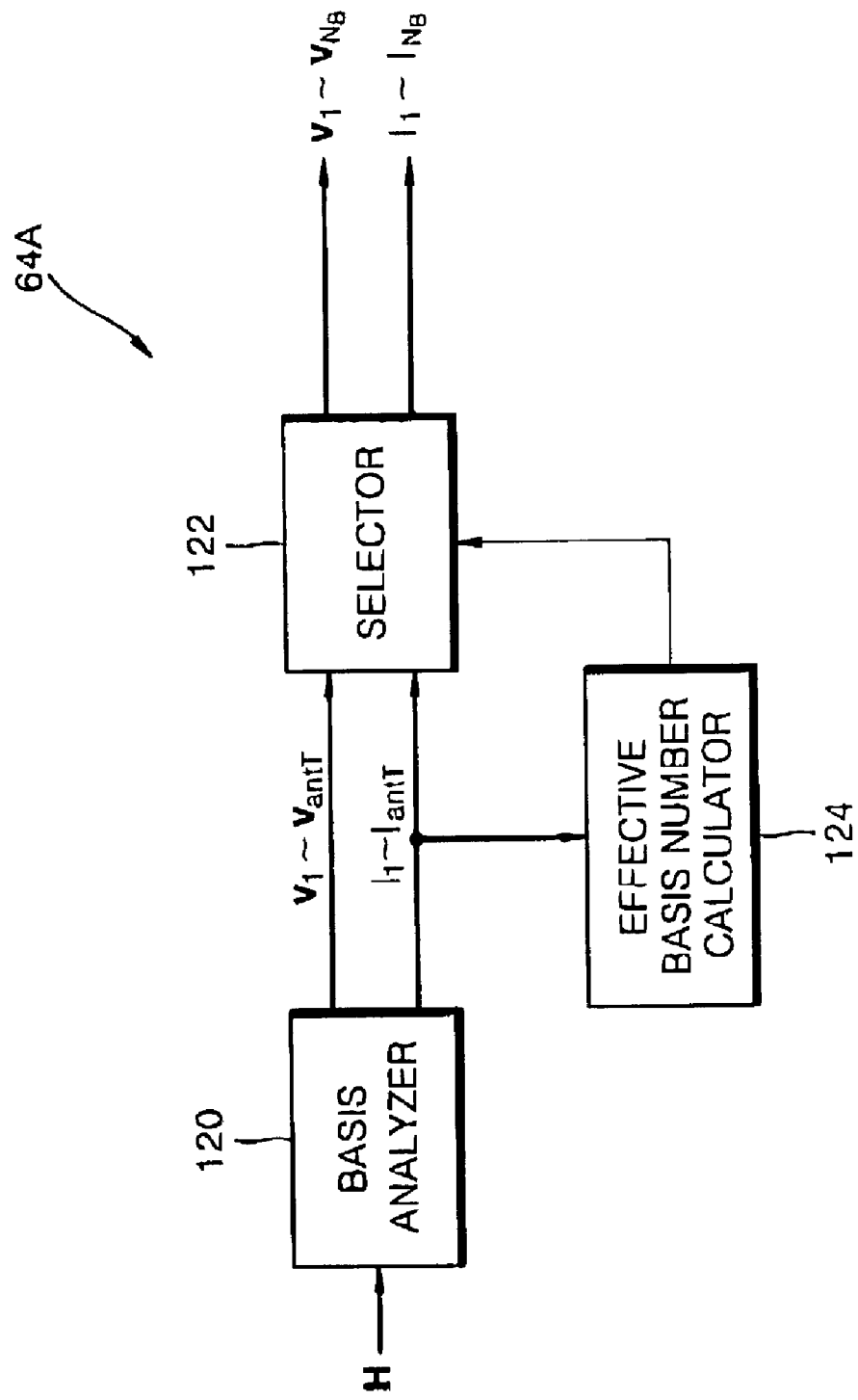
FIG. 6 is a block diagram of an embodiment of the mobile station long-term information determiner of FIG. 4.

FIG. 6 is a block diagram of an embodiment 64A of the mobile station long-term information determiner 64 of FIG. 4. The embodiment 64A includes a basis analyzer 120, a selector 122, and an effective basis number calculator 124.

Referring to FIGS. 5 and 6, the basis analyzer 120 produces the basis vectors $v_1$ through $v_{antT}$ and the basis values $I_1$ through $I_{antT}$ from the channel downlink characteristics H received from the mobile station channel characteristics measurer 62 using a basis decomposition method, outputs the same to the selector 122, and outputs the basis values $I_1$ through $I_{antT}$ to the effective basis number calculator 124, in step 100. Here, the basis decomposition method means an eigen value decomposition (EVD) technique, a singular value decomposition (SVD) technique, or a technique using an arbitrary orthogonal-normal basis. If the EVD method is used as the basis decomposition method, the basis values correspond to eigen values.

After step 100, in step 102, the effective basis number calculator 124 counts the number of basis eigen values that exceed a threshold value $V_{th1}$ and outputs the count value as the effective basis number $N_B$ to the selector 122. To achieve this, the effective basis number counter 124 can be implemented as a counter (not shown). The threshold value $V_{th1}$ is a value close to '0'.

Figure 12:
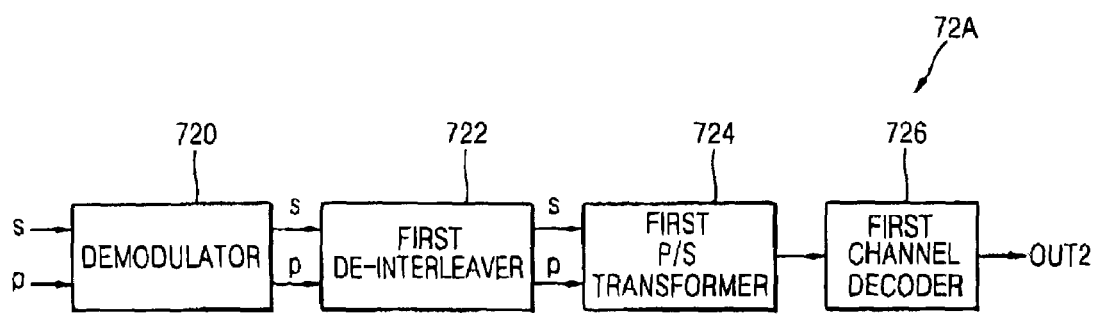
FIG. 12 is a block diagram of an embodiment of the information interpreter of FIG. 4, the information interpreter performing step 50A of FIG. 11.

After step 102, in step 104, the selector 122 selects a number of effective basis vectors $v_1$ through $v_{N_B}$ equal to the effective basis number $N_B$ from the basis vectors $v_1$ through $v_{antT}$ received from the basis analyzer 120 and also selects a number of effective basis values $I_1$ through $I_{N_B}$ equal to the effective basis number $N_B$ from the basis values $I_1$ through $I_{antT}$ received from the basis analyzer 120. The selector 122 outputs the effective basis vectors $v_1$ through $V_{N_B}$ and the effective basis values $I_1$ through $I_{N_B}$ to each of the mobile station long-term information formatter 80 and the basis channel producing unit 82. In an embodiment 72A of the information interpreter 72 as shown in FIG. 12, the selector 122 may output the effective basis values $I_1$ through $I_{N_B}$ to the information interpreter 72.

Referring back to FIGS. 3 and 4, after step 42, in step 44, the mobile station long-term information formatter 80 receives the effective basis vectors $v_1$ through $v_{N_B}$ and the effective basis values $I_1$ through $I_{N_B}$ determined by the mobile station long-term information determiner 64, transforms the received effective basis information, that is, long-term information, into a feedback signal suitable to be fed back to the base station 10, and transfers the feedback signal to the base station 10 through the antenna array 60. Being suitable for feedback means quantizing an effective basis vector and an effective basis value to a minimum level just enough not to be lost, and performing time-division multiplexing on the two quantization results.

To do this, the mobile station long-term information formatter 80 formats the effective basis information, that is, long-term information, received from the mobile station long-term information determiner 64, performs time-division multiplexing on the formatted information, and transfers the time-division multiplexing result as a feedback signal to the basis station 10 through the antenna array 60. The mobile station long-term information formatter 80 may do code-division multiplexing or frequency-division multiplexing instead of the time-division multiplexing.

After step 44, in step 46, the basis channel producing unit 82 receives the effective basis vectors $v_1$ through $v_{N_B}$ and effective basis values $I_1$ through $I_{N_B}$ determined by the mobile station long-term information determiner 64 and the channel downlink characteristics H spatially measured by the mobile station channel characteristics measurer 62, produces a basis channel C using Equation 1, and outputs the same to the multi-antenna data detector 70. Equation 1 is:

$$C = H[\sqrt{T_1}v_1 \sqrt{T_2}v_2 \ldots \sqrt{I_{N_B}}v_{N_B}] \qquad (1)$$

After step 46, in step 48, the multi-antenna data detector 70 detects at least two importance information by a multi-antenna information detection technique using the received signals received via the antenna array 60 and the basis channel C received from the basis channel producing unit 82 and outputs the detected importance information to the information interpreter 72. The number of importance information detected by the multi-antenna data detector 70 varies depending on the embodiment of the information interpreter 72.

After step 48, in step 50, the information interpreter 72 interprets information received from the base station 10 using the importance information received from the multi-antenna data detector 70 and outputs the interpreted information via an output terminal OUT1.

Referring back to FIG. 2, after step 30, in step 32, the base station 10 of FIG. 1 receives a feedback signal from the mobile station 20, 22, . . . , or 24, restores long-term information, that is, effective basis vectors and effective basis values, from the received feedback signal, sequentially maps a Dedicated Physical CHannel (DPCH) signal, that is, N transmission blocks, to effective basis values, adds the results of basis transformation performed on the mapping results to PIlot CHannel (PICH) signals $P_1(k)$, $P_2(k)$, $P_3(k)$, . . . , and $P_{antT}(k)$, and transmits the results of addition to the mobile station 20, 22, . . . , or 24. In the present invention, instead of the DPCH signal, importance information produced by dividing the DPCH signal may be sequentially mapped to the effective basis values.

Figure 7:
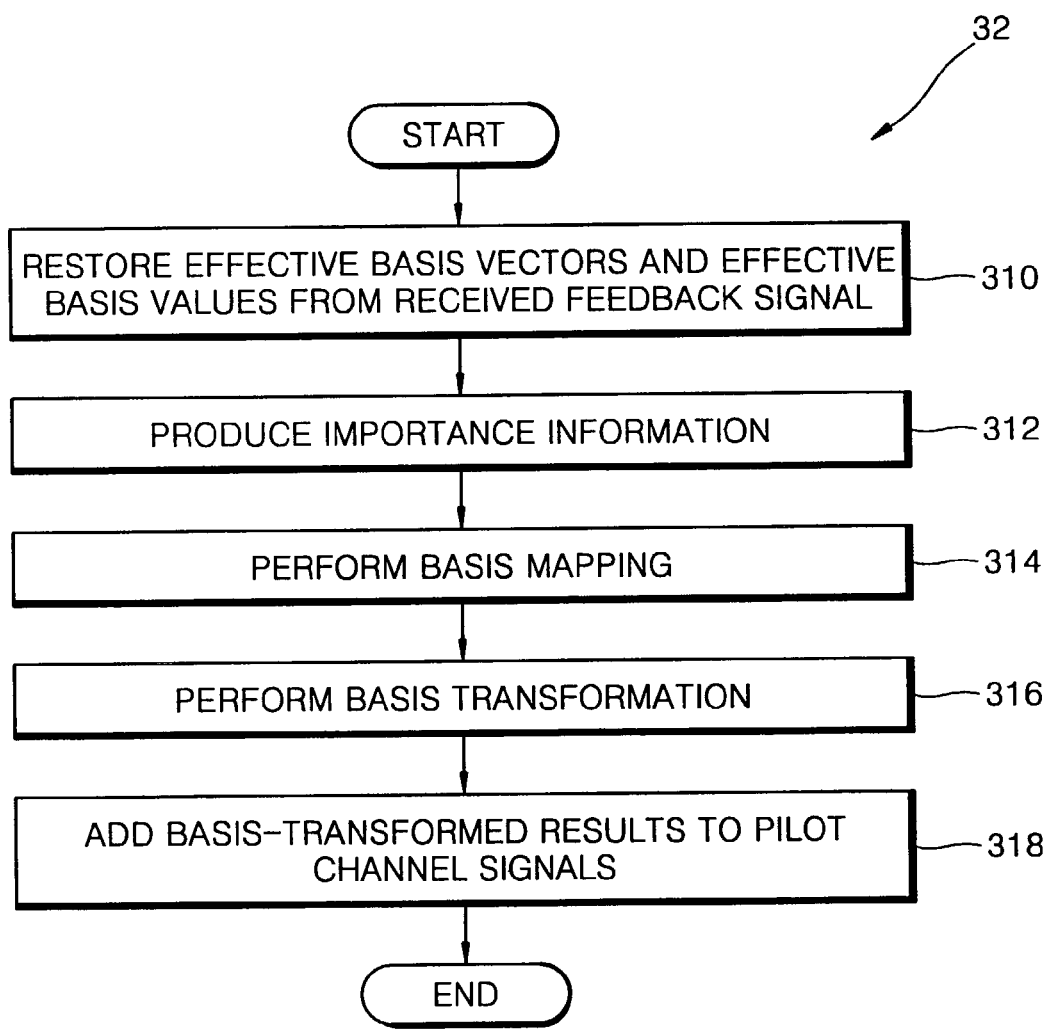
FIG. 7 is a flowchart for illustrating an embodiment of step 32 of FIG. 2, according to the present invention.

An embodiment of step 32 of FIG. 2 and an embodiment of the base station 10 of FIG. 1, according to the present invention, will now be described with reference to FIGS. 7 and 8, respectively. Referring to FIG. 7, an embodiment of step 32 of FIG. 2 includes step 310 of restoring long-term information, steps 312 and 314 of basis-mapping the produced importance information, step 316 of basis-transforming the results of mapping, and step 318 of adding the basis-transformed results to pilot channel signals.

Figure 8:
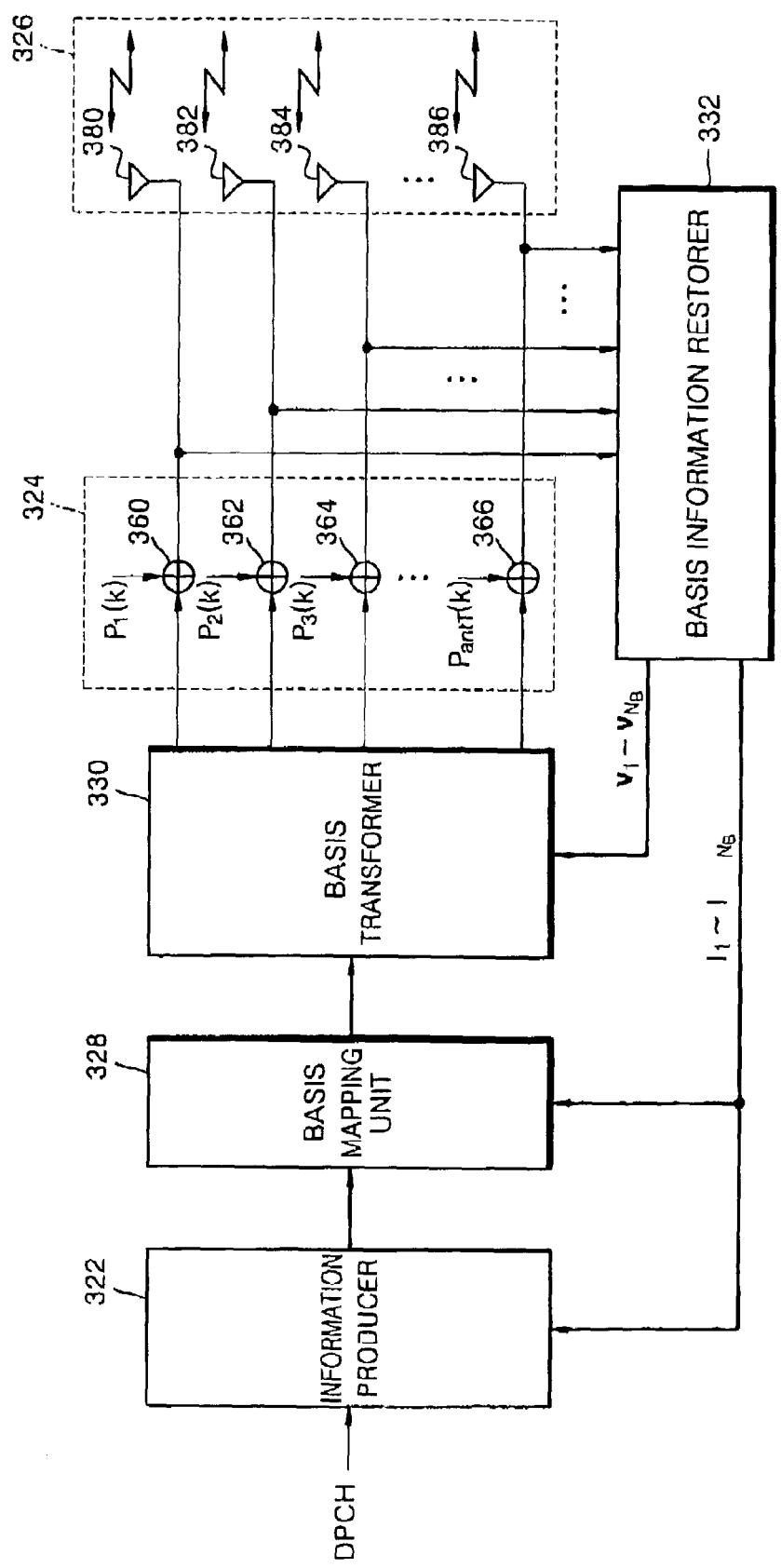
FIG. 8 is a block diagram of an embodiment of the base station of FIG. 1, according to the present invention.

Referring to FIG. 8, an embodiment of the base station 10 of FIG. 1 includes an information producer 322, a basis mapping unit 328, a basis transformer 330, an adder 324, an antenna array 326, and a basis information restorer 332. Here, a black arrow between members indicates a plurality of signals, and a light arrow indicates a single signal.

In order to perform step 32 of FIG. 2, first, in step 310, the basis information restorer 332 restores as effective basis information the effective basis vectors $v_1$ through $v_{N_B}$ and effective basis values $I_1$ through $I_{N_B}$, which correspond to long-term information, from a feedback signal received from the antenna array 326 via an uplink Dedicated Physical Control CHannel (DPCCH), outputs the effective basis values $I_1$ through $I_{N_B}$ to the basis mapping unit 328 and outputs the effective basis vectors $v_1$ through $v_{N_B}$ to the basis transformer 330. Depending on the embodiment of the information producer 322 to be described later, the basis information restorer 332 may output the effective basis values $I_1$ through $I_{N_B}$ to the information producer 322.

After step 310, in step 312, the information producer 322 produces importance information from N received transmission blocks, that is, a DPCH signal, and outputs the produced importance information to the basis mapping unit 328. As will be described later, embodiments of the information producer 322 produce at least two pieces of importance information. That is, the information producer 322 produces as many pieces of importance information as the number of effective bases, $N_B$.

After step 312, in step 314, the basis mapping unit 328 sequentially multiplies the importance information received from the information producer 322 by the square roots of the effective basis values $I_1$ through $I_{N_B}$ received from the basis information restorer 332 in a one-to-one correspondence and outputs the multiplication results as the basis-mapped results to the basis transformer 330. If the information producer 322 produces first and second importance information $s_{mod}$ and $p_{mod}$, and $N_B$ is 2, basis-mapped results $s_{map}$ and $p_{map}$ can be calculated using Equation 2:

$$s_{map} = s_{mod} \cdot \sqrt{I_1}, \quad p_{map} = p_{mod} \cdot \sqrt{I_2} \qquad (2)$$

wherein $I_1$ and $I_2$ denote effective basis values restored by the basis information restorer 332. Here, $I_1$ is greater than or equal to $I_2$.

Step 312 of FIG. 7 is optional. If step 312 is omitted, step 310 is followed by step 314 where the basis mapping unit 328 sequentially multiplies the DPCH signal by each of the square roots of the effective basis values $I_1$ through $I_{NB}$ received from the basis information restorer 332 and outputs the multiplication results as the basis-mapped results to the basis transformer 330.

The base station 10 of FIG. 8 may further include a DPCH producer (not shown) for receiving a DPCCH signal and a Dedicated Physical Information CHannel (DPICH) signal and multiplexing the received DPCCH and DPICH signals to have the format of the DPCH signal.

After step 314, in step 316, the basis transformer 330 multiplies the basis-mapped results received from the basis mapping unit 328 by the effective basis vectors $v_1$ through $v_{N_B}$ received from the basis information restorer 332 in a one-to-one correspondence, sums the multiplied results, and outputs the sum x to the adder 324. If the basis-mapped results are as shown in Equation 2, the basis transformer 328 can obtain a sum x as expressed in Equation 3:

$$x = s_{map} \cdot v_1 + p_{map} \cdot v_2 \qquad (3)$$

wherein $v_1$ and $v_2$ denote effective basis vectors sequentially restored from fed-back information. As for the effective basis values $I_1$ and $I_2$ corresponding to the effective basis vectors $v_1$ and $v_2$, respectively, $I_1$ is equal to or greater than $I_2$.

After step 316, in step 318, the adder 324 adds the sum x received from the basis transformer 330 to each of the PICH signals $P_1(k), P_2(k), P_3(k), \ldots$, and $P_{antT}(k)$, and outputs the addition results to the antenna array 326. The PICH signals $[P_i(k)]$ ($1 \leq i \leq antT$) can be common pilot channel signals (CPICH), dedicated CPICH signals (DCPICH), or secondary CPICH signals (SCPICH). If the PICH signal $[P_i(k)]$ is CPICH, $P_i(k)$ corresponds to a signal $CPICH_i$. In order to perform step 318, the adder 324 may include adding units 360, 362, 364, ..., and 366, the number of which is equal to antT. The adding units 360, 362, 364, ..., and 366 add the basis transformation result x received from the basis transformer 330 to the signals $P_1(k), P_2(k), P_3(k), \ldots$, and $P_{antT}(k)$, respectively, and output the addition results to the transmission antennas 380, 382, 384, ..., and 386, respectively, in the antenna array 326. The antenna array 326 transmits the results of the addition by the adder 324 to the mobile station 20, 22, ..., or 24. To do this, the antenna array 326 includes the antennas 380, 382, 384, ..., and 386, the number of which is equal to antT. The antennas 380, 382, 384, ..., and 386 transmit the results of the additions by the adding units 360, 362, 364, ..., and 366 to the corresponding mobile station 20, 22, ..., or 24.

Figure 9:
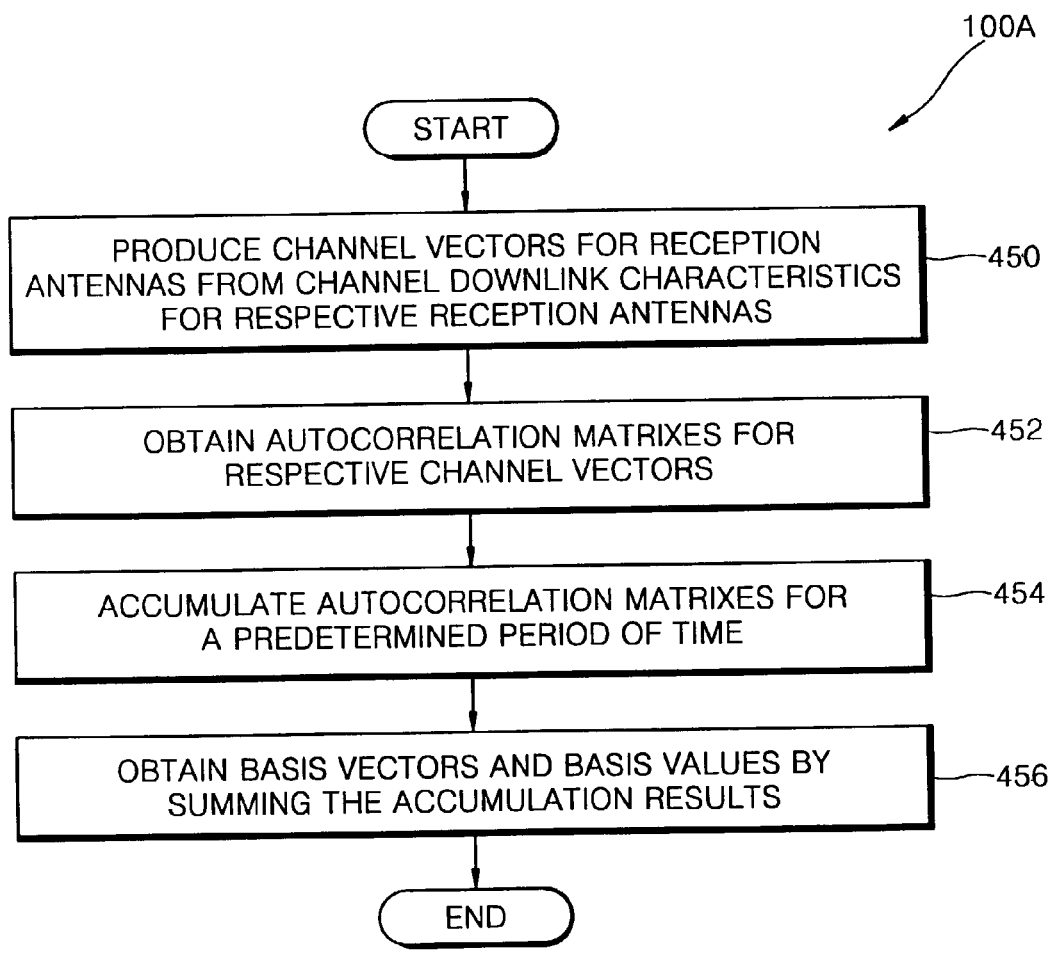
FIG. 9 is a flowchart for illustrating a preferred embodiment of step 100 of FIG. 5.

An embodiment of the step 100 of FIG. 5 and an embodiment of the basis analyzer 120 of FIG. 6, according to the present invention, will now be described with reference to FIGS. 9 and 10. FIG. 9 is a flowchart for illustrating a preferred embodiment 100A of the step 100 of FIG. 5 to obtain the basis vectors $v_1$ through $v_{antT}$ and the basis values $I_1$ through $I_{antT}$. The embodiment 100A includes a step 450 of producing channel vectors for respective reception antennas, a step 452 of obtaining autocorrelation matrixes, a step 454 of accumulating the autocorrelation matrixes, and a step 456 of obtaining the basis vectors and basis values using an eigen decomposition technique.

Figure 10:
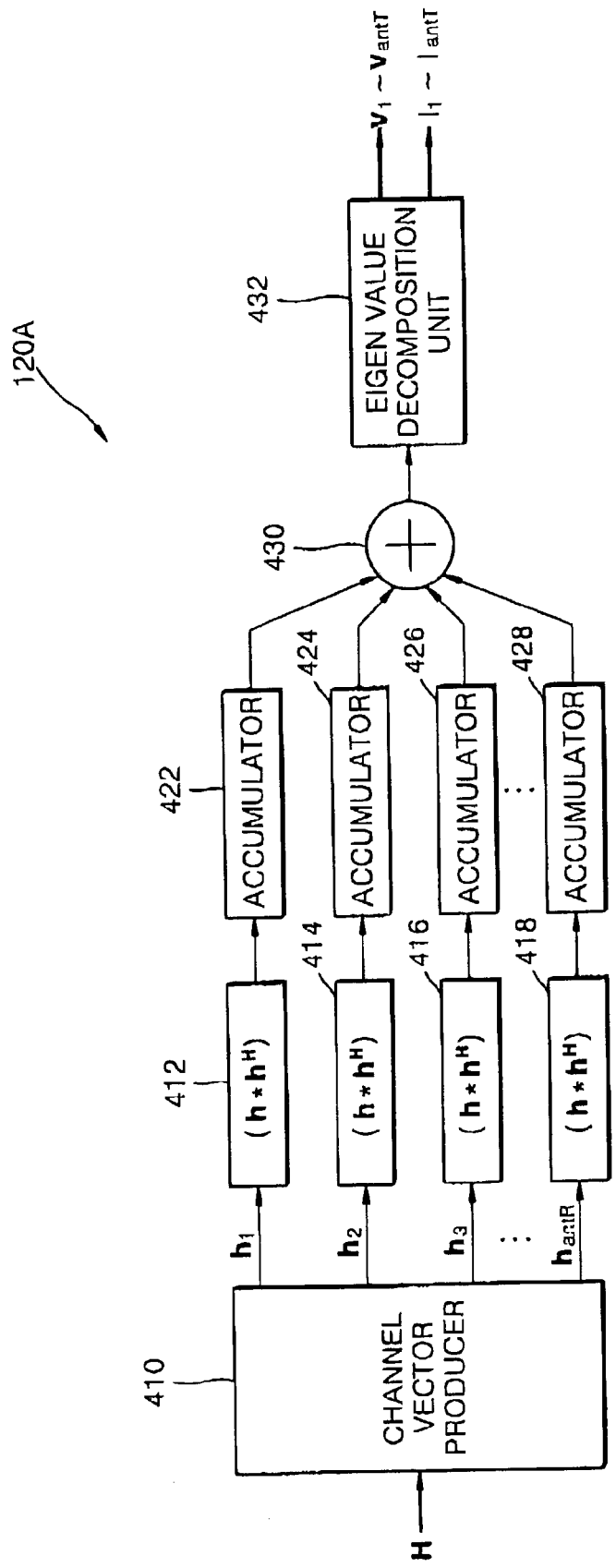
FIG. 10 is a block diagram of an embodiment 120A of the basis analyzer 120 of FIG. 6, according to the present invention.

Referring to FIG. 10, an embodiment 120A of the basis analyzer 120 of FIG. 6 includes a channel vector producer 410, autocorrelation matrix calculators 412, 414, 416, ..., and 418, accumulators 422, 424, 426, ..., and 428, an adder 430, and an eigen value decomposition unit 432. Here, a black arrow between members indicates a plurality of signals, and a light arrow between members indicates a single signal.

In step 450, the channel vector producer 410 of FIG. 10 produces channel vectors $h_1, h_2, h_3, \ldots$, and $h_{antR}$ of respective reception antennas by dividing the downlink characteristics H of a channel into transceiving antennas. Here, antR denotes the number of reception antennas, that is, the number of antennas included in the antenna array 60. After step 450, in step 452, the autocorrelation matrix calculators 412, 414, 416, ..., and 418, the number of which is antR, calculate using Equation 4 the autocorrelation matrix Ri of each of the channel vectors $h_1, h_2, h_3, \ldots$, and $h_{antR}$ produced by the channel vector producer 410 and output the same to the accumulators 422, 424, 426, ..., and 428, the number of which is antR, respectively. Equation 4 is as follows:

$$R_i = h_i \cdot h_i^H \qquad (4)$$

After step 452, in step 454, the accumulators 422, 424, 426, ..., and 428 accumulate the autocorrelation matrixes received from the autocorrelation matrix calculators 412, 414, 416, ..., and 418 for a predetermined period of time, respectively, and output the accumulation results to the adder 430. After step 454, in step 456, the adder 430 sums the results of the accumulations by the accumulators 422, 424, 426, ..., and 428 and outputs the sum to the eigen value decomposition unit 432, and the eigen value decomposition unit 432 obtains eigen vectors and eigen values from the sum obtained by the adder 430 using the above-described eigen decomposition technique, determines the eigen vectors as the basis vectors $v_1$ through $v_{antT}$, and determines the eigen values as the basis values $I_1$ through $I_{antT}$.

Preferred embodiments of step 50 of FIG. 3, preferred embodiments of the information interpreter 72 for performing step 50, preferred embodiments of step 312 of FIG. 7, and preferred embodiments of the information producer 322 for performing step 312 will now be described referring to the attached drawings.

Figure 11:
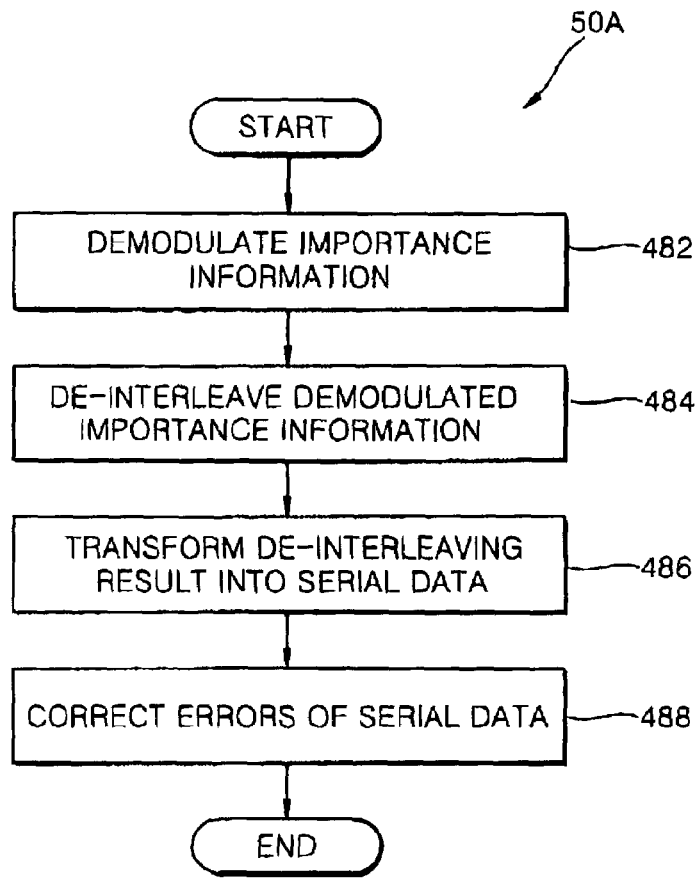
FIG. 11 is a flowchart for illustrating an embodiment of step 50 of FIG. 3.

FIG. 11 is a flowchart for illustrating an embodiment 50A of step 50 of FIG. 3. Step 50A includes a step 482 of demodulating two pieces of importance information, a step 484 of de-interleaving the demodulated importance information, a step 486 of transforming parallel data into serial data, and a step 488 of correcting the errors of the serial data.

FIG. 12 is a block diagram of an embodiment 72A of the information interpreter 72 of FIG. 4. In order to perform step 50A of FIG. 11, the information interpreter 72A includes a demodulator 720, a first de-interleaver 722, a first parallel-to-serial (P/S) transformer 724, and a first channel decoder 726.

Referring to FIGS. 11 and 12, after step 48 of FIG. 3, in step 482, the demodulator 720 demodulates first and second importance information s and p received from the multi-antenna data detector 70 of FIG. 4 and outputs the demodulated importance information to the first de-interleaver 722. After step 482, in step 484, the first de-interleaver 722 de-interleaves the demodulated importance information received from the demodulator 720 and outputs the de-interleaving result to the first P/S transformer 724. After step 484, in step 486, the first P/S transformer 724 transforms the de-interleaving result received from the first de-interleaver 722 into serial data and outputs the serial data to the first channel decoder 726. After step 486, in step 488, the first channel decoder 726 corrects the errors of the serial data received from the first P/S transformer 724 and outputs the corrected serial data via an output terminal OUT2 to, for example, a speaker (not shown).

Figure 13:
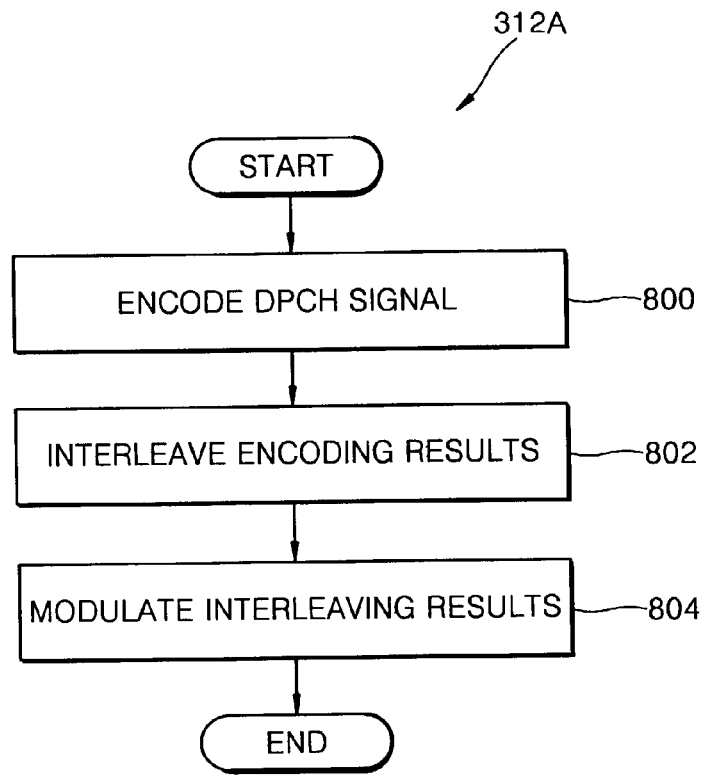
FIG. 13 is a flowchart for illustrating a preferred embodiment of step 312 of FIG. 7.
Figure 14:
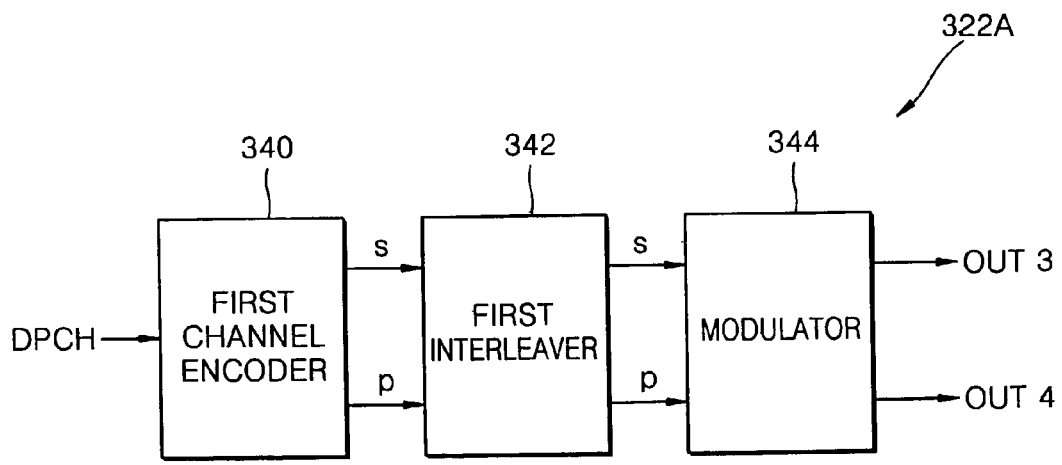
FIG. 14 is a block diagram of a preferred embodiment of the information producer of FIG. 8, the information producer performing step 312A of FIG. 13.

When step 50 is implemented as shown in FIG. 11 and the information interpreter 72 is constructed as shown in FIG. 12, step 312 and the information producer 322 can be implemented as shown in FIGS. 13 and 14 according to the present invention, respectively.

FIG. 13 is a flowchart for illustrating a preferred embodiment 312A of step 312 of FIG. 7. Step 312A includes steps 800, 802, and 804 of encoding, interleaving and modulating first and second produced importance information, respectively.

FIG. 14 is a block diagram of a preferred embodiment 322A of the information producer 322 of FIG. 8. In order to perform step 312A of FIG. 13, the information producer 322A includes a first channel encoder 340, a first interleaver 342, and a modulator 344.

Referring to FIGS. 13 and 14, after step 310 of FIG. 7, in step 800, the first channel encoder 340 encodes the DPCH signal to produce the first and second pieces of importance information s and p and outputs the first and second importance information s and p to the first interleaver 342. After step 800, in step 802, the first interleaver 342 interleaves the first and second importance information s and p received from the first channel encoder 340, that is, randomly arranges the bits of each of the first and second importance information in a predetermined pattern, and outputs the first and second interleaved importance information to the modulator 344. After step 802, in step 804, the modulator 344 modulates the first and second interleaved importance information and outputs the first and second modulated importance information via output terminals OUT3 and OUT4, respectively, to the basis mapping unit 328 of FIG. 8. The method then proceeds to step 314 of FIG. 7.

Figure 15:
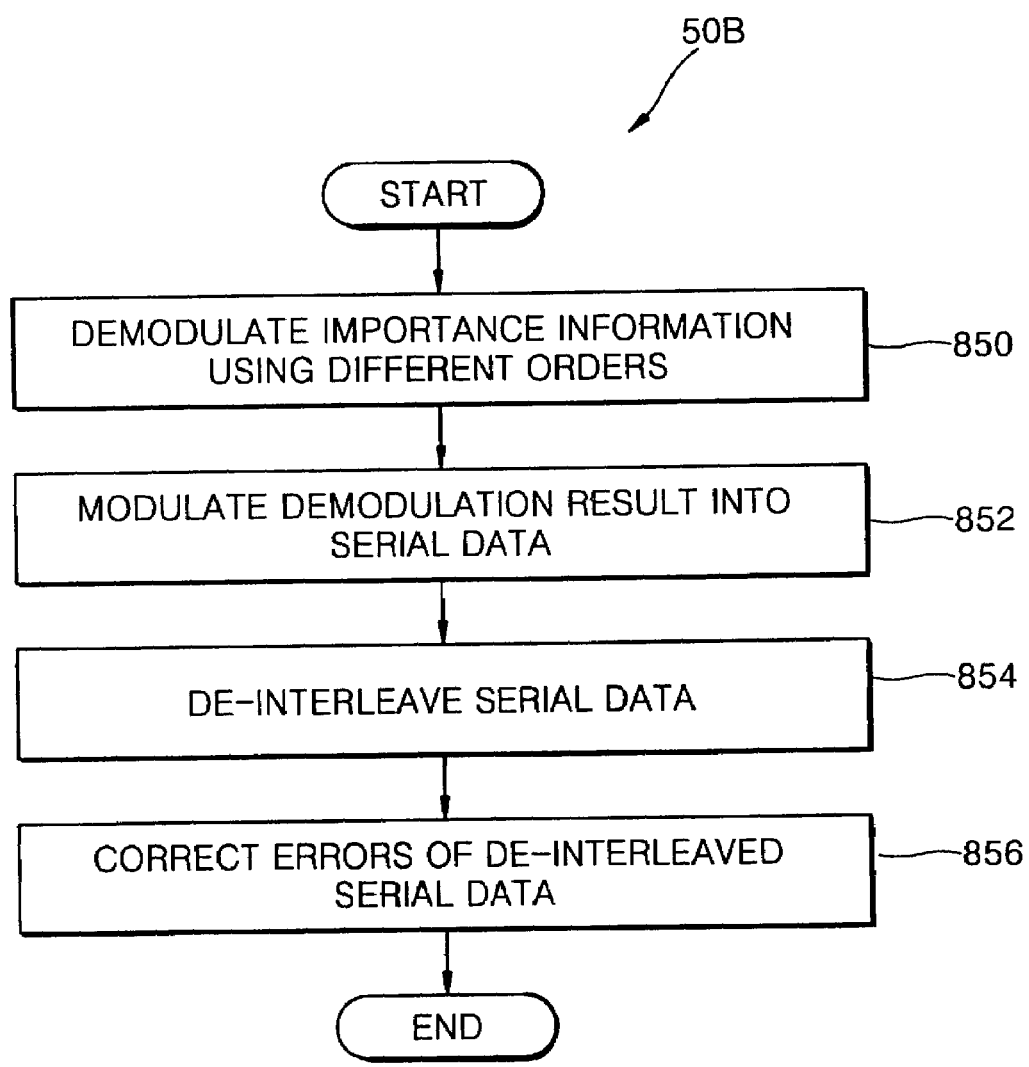
FIG. 15 is a flowchart for illustrating another embodiment of step 50 of FIG. 3.

FIG. 15 is a flowchart for illustrating another embodiment 50B of step 50 of FIG. 3, according to the present invention. Step 50B includes steps 850 and 852 of demodulating importance information and transforming demodulation result into serial data, respectively, and steps 854 and 856 of de-interleaving the serial data and correcting the errors of the serial data, respectively.

Figure 16:
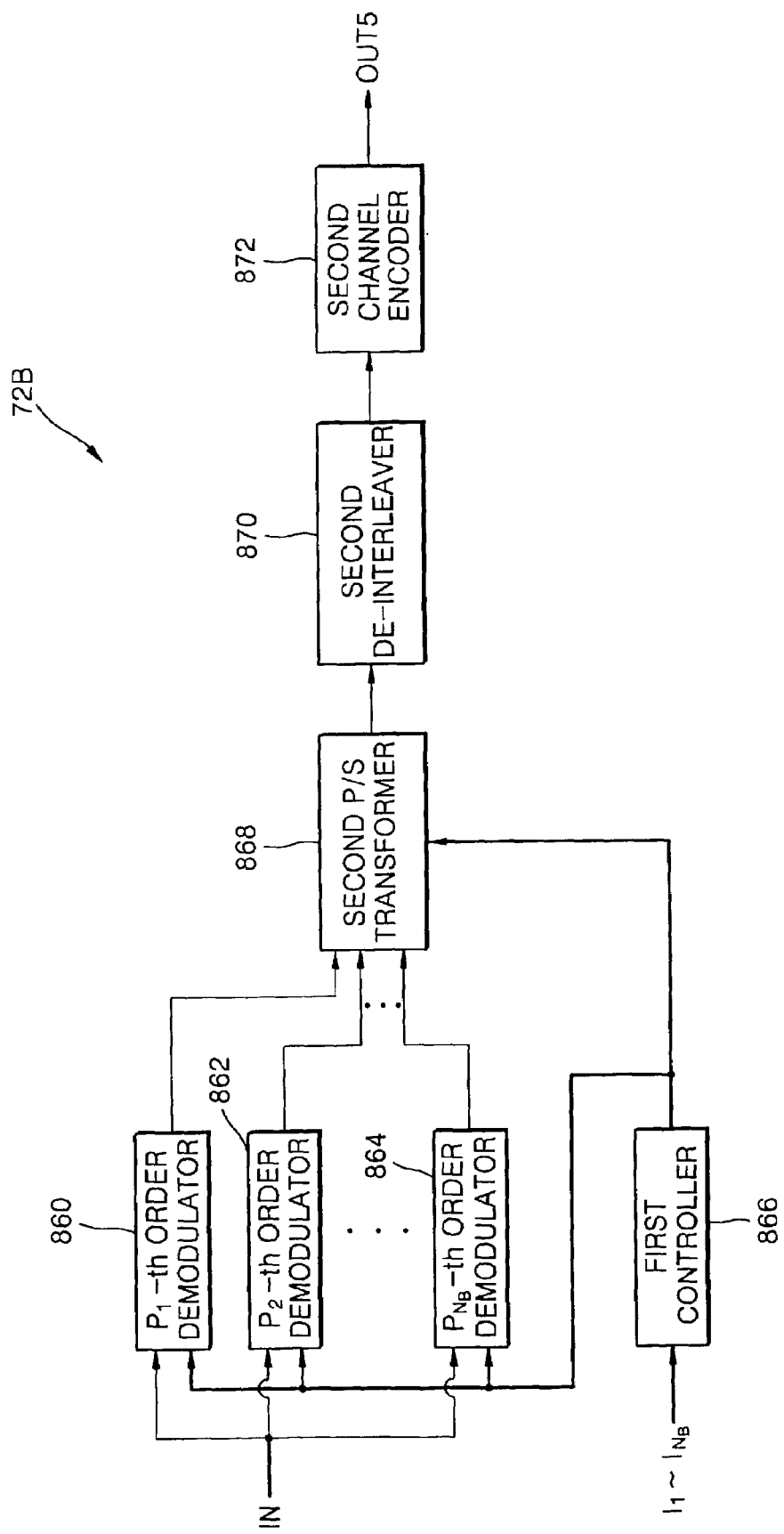
FIG. 16 is a block diagram of another embodiment of the information interpreter of FIG. 4, the information interpreter performing step 50B of FIG. 15.

FIG. 16 is a block diagram of another embodiment 72B of the information interpreter 72 of FIG. 4, according to the present invention. In order to achieve step 50B of FIG. 15, the information interpreter 72B includes $P_1$-th, $P_2$-th, . . . , and $P_{N_B}$-th order demodulators 860, 862, . . . , and 864, a first controller 866, a second parallel-to-serial (P/S) transformer 868, a second de-interleaver 870, and a second channel decoder 872. Here, a black arrow between members indicates a plurality of signals, and a light arrow between members indicates a single signal.

Referring to FIGS. 15 and 16, after step 48 of FIG. 3, in step 850, the $P_1$-th, $P_2$-th, . . . , and $P_{N_B}$-th order demodulators 860, 862, . . . , and 864 demodulate the importance information received from the multi-antenna data detector 70 via an input terminal IN using different orders determined by the first controller 866, that is, a $P_1$-th order, a $P_2$-th order, . . . , and a $P_{N_B}$-th order. To do this, each of the $P_1$-th, $P_2$-th, . . . , and $P_{N_B}$-th order demodulators 860, 862, . . . , and 864 can perform quadrature amplitude demodulation or phase shift keying (PSK) demodulation. After step 850, in step 852, the second P/S transformer 868 transforms the demodulation results into serial data under the control of the first controller 866 and outputs the serial data to the second de-interleaver 870.

The first controller 866 receives the effective basis values $I_1$ through $I_{N_B}$ from the mobile station long-term information determiner 64 of FIG. 4, calculates the ratio of the basis value $I_1$ to each of the other basis values, determines the orders, that is, the $P_1$-th order, the $P_2$-th order, . . . , and the $P_{N_B}$-th order, from the calculated ratios, and controls the $P_1$-th, $P_2$-th, . . . , and $P_{N_B}$-th order demodulators 860, 862, . . . , and 864 and the second P/S transformer 868 according to the determined order values. For example, the first controller 866 determines the orders $P_1, P_2, \ldots,$ and $P_{N_B}$ using Equation 5:

$$2^{P_1-P_2} \propto \frac{I_2}{I_1}, 2^{P_1-P_3} \propto \frac{I_3}{I_1} \tag{5}$$

After step 852, in step 854, the second de-interleaver 870 de-interleaves the serial data transformed by the second P/S transformer 868 and outputs the de-interleaved serial data to the second channel decoder 872. After step 854, in step 856, the second channel decoder 872 decodes the de-interleaved serial data received from the second de-interleaver 870 to correct the errors of the de-interleaved serial data and outputs the error-corrected information via an output terminal OUT5 to, for example, a speaker (not shown).

Figure 17:
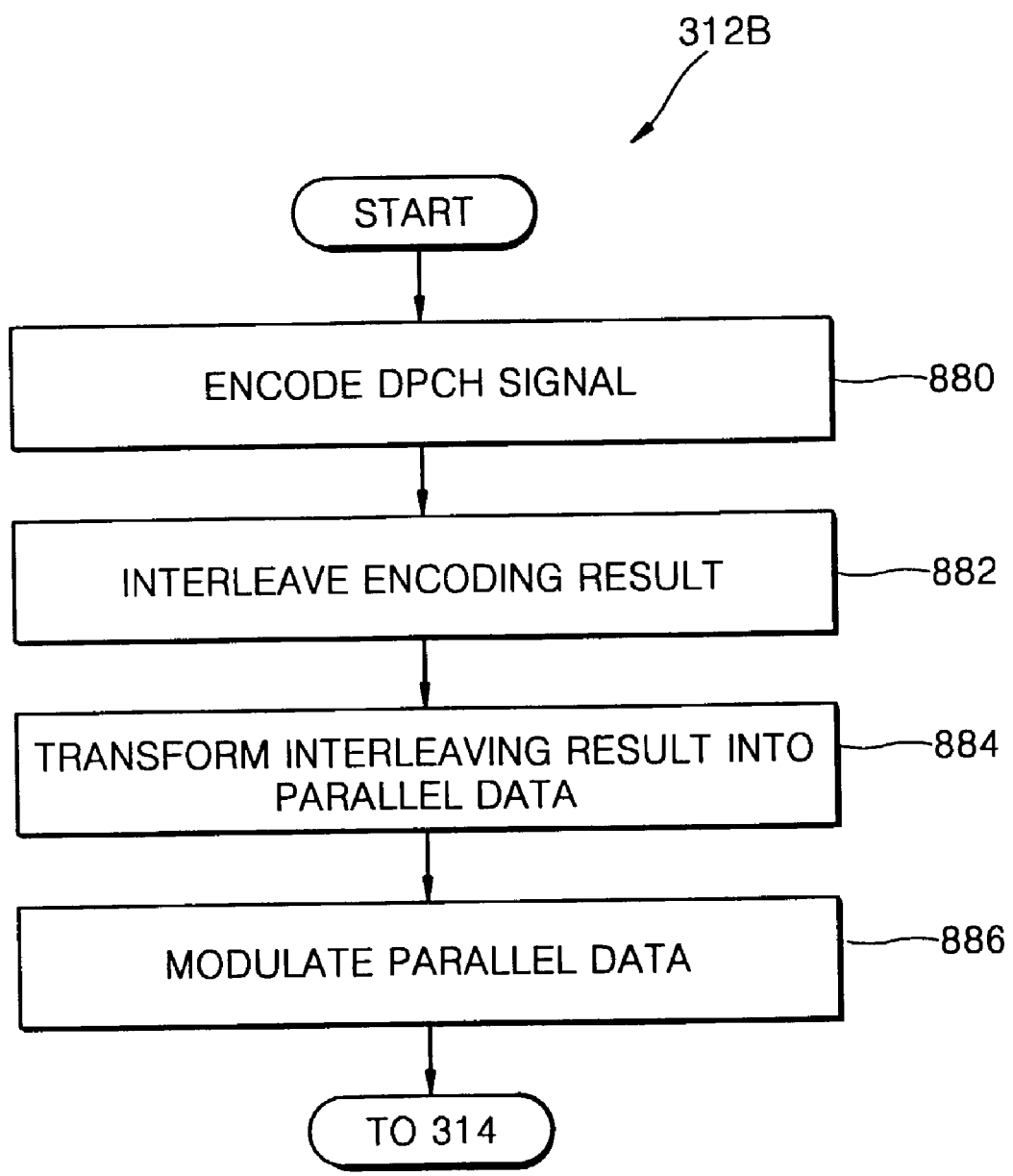
FIG. 17 is a flowchart for illustrating another embodiment of step 312 of FIG. 7.
Figure 18:
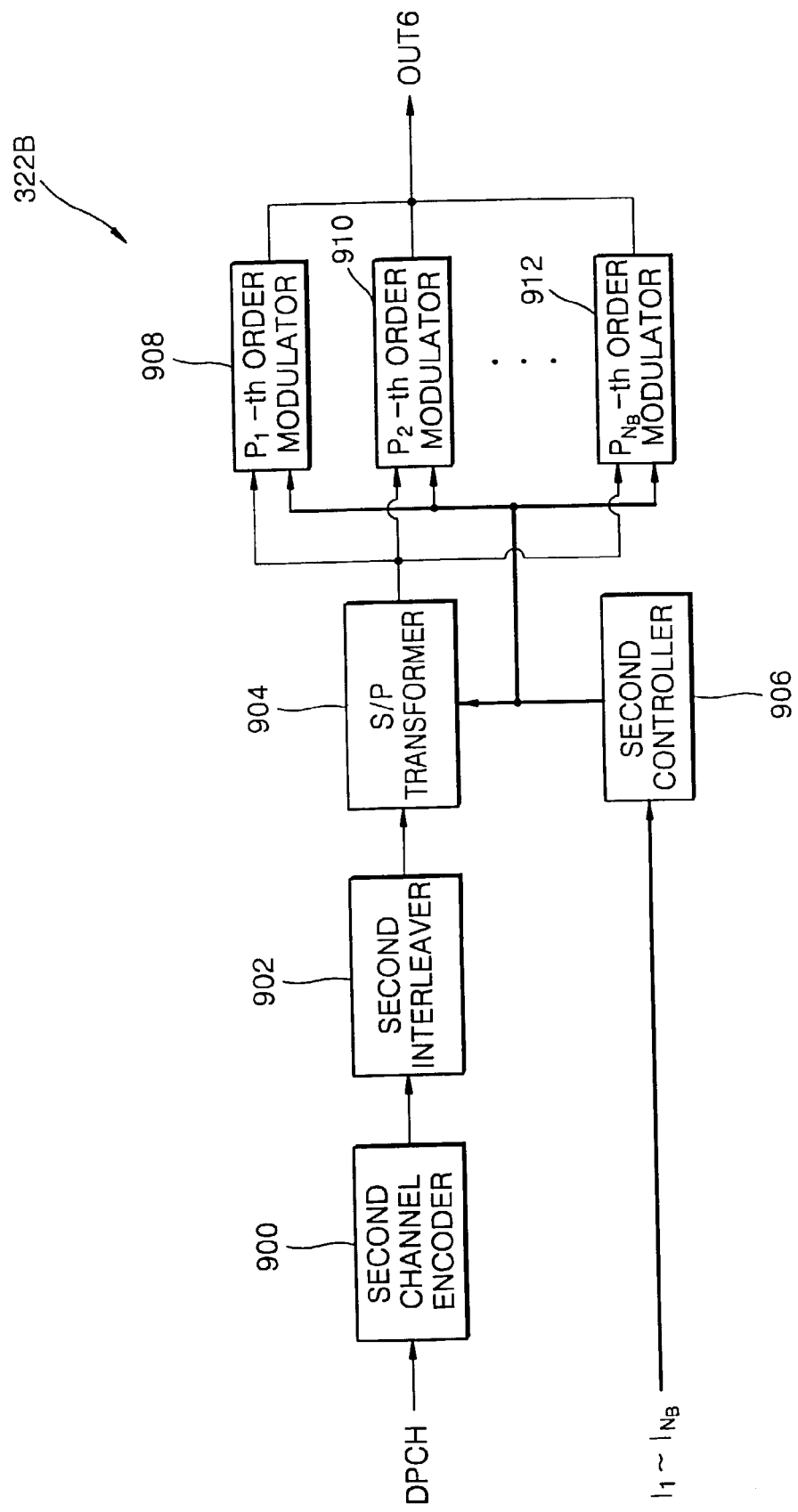
FIG. 18 is a block diagram of another embodiment of the information producer of FIG. 8.

When step 50 is performed as shown in FIG. 15, and the information interpreter 72 is implemented as shown in FIG. 16, step 312 and the information producer 322 are implemented as shown in FIGS. 17 and 18 according to the preset invention, respectively.

FIG. 17 is a flowchart for illustrating another embodiment 312B of step 312 of FIG. 7. Step 312B includes steps 880, 882 and 884 of encoding and interleaving a signal DPCH and transforming the interleaved information into parallel data, respectively, and a step 886 of modulating the parallel data.

FIG. 18 is a block diagram of another preferred embodiment 322B of the information producer 322 of FIG. 8. In order to perform step 312B of FIG. 17, the information producer 322B includes a second channel encoder 900, a second interleaver 902, a serial-to-parallel (S/P) transformer 904, a second controller 906, and $P_1$-th, $P_2$-th, ..., and $P_{N_B}$-th order modulators 908, 910, ..., and 912. Here, a black arrow between members indicates a plurality of signals, and a light arrow between members indicates a single signal.

Referring to FIGS. 17 and 18, after step 310 of FIG. 7, in step 880, the second channel encoder 900 receives and encodes the DPCH signal and outputs encoded data to the second interleaver 902. After step 880, in step 882, the second interleaver 902 interleaves the encoded data received from the second channel encoder 900 and outputs the interleaved data to the S/P transformer 904. After step 882, in step 884, the S/P transformer 904 transforms the interleaved data received from the second interleaver 902 into parallel data under the control of the second controller 906 and outputs the parallel data to the $P_1$-th, $P_2$-th, ..., and $P_{N_B}$-th order modulators 908, 910, ..., and 912. After step 884, in step 886, the $P_1$-th, $P_2$-th, ..., and $P_{N_B}$-th order modulators 908, 910, ..., and 912 modulate the received parallel data and outputs the modulated parallel data via an output terminal OUT6 to the basis mapping unit 328 of FIG. 8. If the $P_1$-th, $P_2$-th, ..., and $P_{N_B}$-th order demodulators 860, 862, ..., and 864 of FIG. 16 perform quadrature amplitude demodulations, the $P_1$-th, $P_2$-th, ..., and $P_{N_B}$-th order modulators 908, 910, ..., and 912 of FIG. 18 perform quadrature amplitude modulations. Similarly, If the $P_1$-th, $P_2$-th, ..., and $P_{N_B}$-th order demodulators 860, 862, ..., and 864 of FIG. 16 perform PSK demodulations, the $P_1$-th, $P_2$-th, ..., and $P_{N_B}$-th order modulators 908, 910, ..., and 912 of FIG. 18 perform PSK modulations.

Here, the second controller 906, which controls the S/P transformer 904 and the $P_1$-th, $P_2$-th, ..., and $P_{N_B}$-th order modulators 908, 910, ..., and 912, performs the same function as that of the first controller 866. That is, the second controller 906 determines orders $P_1$, $P_2$, ..., and $P_{N_B}$ from the effective basis values $I_1$ through $I_{N_B}$ received from the basis information restorer 332 of FIG. 8, and controls the S/P transformer 904 and the $P_1$-th, $P_2$-th, ..., and $P_{N_B}$-th order modulators 908, 910, ..., and 912 according to the determined orders.

As described above, in a mobile communication apparatus having a base station and mobile stations that each include an antenna array and a mobile communication method performed in the mobile communication apparatus according to the present invention, information in which the downlink characteristics of a space channel has been reflected is fed back from the mobile stations to the base station. This minimizes the effects of fading, interference, and noise and maximizes throughput.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A mobile communication apparatus, comprising:
a base station having a first plurality of antennas;
a mobile station having a second plurality of antennas, the mobile station measuring downlink characteristics of a channel for each combination of the first plurality of antennas and the second plurality of antennas from a signal received from the base station, determining long-term information in which a correlation property of the channel for each combination has been reflected from the measured downlink characteristics, transforming the long-term information into a feedback signal, and transmitting the feedback signal to the base station; and
the base station for receiving the feedback signal, restoring the long-term information from the received feedback signal, performing basis mapping and basis transformation on a dedicated physical channel signal using the restored long-term information, adding the basis-mapped and basis-transformed signal to each of a plurality of pilot channel signals, and transmitting the addition results to the mobile station.

2. The mobile communication apparatus as claimed in claim 1, wherein the mobile station comprises:
a mobile station channel characteristics measurer for receiving the signal from the base station, spatially measuring the downlink characteristics from the received signal, and outputting the measured downlink characteristics;
a mobile station long-term information determiner for producing basis vectors and basis values from the measured downlink characteristics received from the mobile station channel characteristics measurer, calculating an effective basis number, which indicates the number of effective basis vectors among the basis vectors, from the basis values, and outputting effective basis vectors and effective basis values as the long-term information; and
a mobile station long-term information formatter for transforming the long-term information received from the mobile station long-term information determiner into the feedback signal.

3. The mobile communication apparatus as claimed in claim 2, wherein the base station comprises:
a basis information restorer for receiving the feedback signal, restoring the long-term information from the feedback signal, and outputting the restored long-term information;
a basis mapping unit for performing the basis mapping by mapping the dedicated physical channel signal to the effective basis values out of the long-term information received from the basis information restorer and outputting the mapping results;
a basis transformer for performing the basis transformation by multiplying the mapping results received from the basis mapping unit by the effective basis vectors out of the long-term information and outputting the basis transformation results; and
an adder for adding the transformation results received from the basis transformer to the pilot channel signals and outputting the addition results,
wherein the addition results are transferred via the antenna array in the base station to the mobile station.

4. The mobile communication apparatus as claimed in claim 3, wherein the mobile station long-term information determiner comprises:

a basis analyzer for producing the basis vectors and the basis values from the measured downlink characteristics using a basis analysis technique;

an effective basis number calculator for counting the number of basis values that exceeds a threshold value and outputting the counted value as the effective basis number; and a selector for selecting the effective basis vectors whose number corresponds to the effective basis number from the basis vectors received from the basis analyzer and selecting the effective basis values whose number corresponds to the effective basis number from the basis values received from the basis analyzer.

5. The mobile communication apparatus as claimed in claim 4, wherein the basis analyzer comprises:

a channel vector producer for dividing the downlink characteristics into channel vectors associated with the antennas of the antenna array included in the mobile station and outputting the channel vectors;

autocorrelation matrix calculators for calculating the autocorrelation matrixes for the respective channel vectors received from the channel vector producer and outputting the calculated autocorrelation matrixes;

accumulators for accumulating for a predetermined period of time each of the autocorrelation matrixes received from the autocorrelation matrix calculators;

an adder for summing the accumulation results received from the accumulators; and an eigen value decomposition unit for producing the basis vectors and the basis values from the sum received from the adder using the basis analysis technique.

6. The mobile communication apparatus as claimed in claim 4, wherein the mobile station produces a basis channel by calculating the long-term information and the downlink characteristics, detects at least two pieces of importance information from the basis channel and received signals received via the antenna array using a multi-antenna information detection technique, and interprets information received from the base station from the importance information, and the base station produces the at least two pieces of importance information by dividing the dedicated physical channel signal and performing the basis mapping and basis transformation on the importance information using the long-term information.

7. The mobile communication apparatus as claimed in claim 4, wherein the mobile station further comprises:

a basis channel producing unit for producing the basis channel C using the long-term $$C=H[\sqrt{I_1}v_1 \sqrt{I_2}v_2 \ldots \sqrt{I_{N_B}}v_{N_B}]$$

information and the downlink characteristics H as follows: wherein $V_1$ through $V_{N_B}$ denote the effective basis vectors, $I_1$ through $I_{N_B}$ denote the effective basis values, and $N_B$ denotes the effective basis number;

a multi-antenna data detector for detecting the importance information from the received signals received via the antenna array and the basis channel C received from the basis channel producer using the multi-antenna information detection technique; and an information interpreter for interpreting information received from the base station using the importance information received from the multi-antenna data detector.

8. The mobile communication apparatus as claimed in claim 7, wherein the base station further comprises a information producer for producing the importance information by dividing the dedicated physical channel signal, and outputting the produced importance information to the basis mapping unit, and the basis mapping unit performs the basis mapping by mapping the importance information to the effective basis values.

9. The mobile communication apparatus as claimed in claim 8, wherein the information interpreter comprises:

a demodulator for demodulating the importance information received from the multi-antenna data detector;

a first de-interleaver for de-interleaving the demodulated information received from the demodulator;

a first parallel-to-serial (P/S) transformer for transforming the de-interleaving result received from the first de-interleaver into serial data; and a first channel decoder for correcting the errors of the serial data received from the first P/S transformer.

10. The mobile communication apparatus as claimed in claim 8, wherein the information interpreter comprises:

$P_1$-th, $P_2$-th, . . . , and $P_{N_B}$-th order demodulators for demodulating the importance information received from the multi-antenna data detector using an equal number of different orders to the effective basis number;

a second P/S transformer for transforming the demodulation results received from the $P_1$-th, $P_2$-th, . . . , and $P_{N_B}$-th order demodulators into serial data;

a first controller for calculating the ratios between the effective basis values received from the mobile station long-term information determiner, determining the different orders, that is, a $P_1$-th order, a $P_2$-th order, . . . , and a $P_{N_B}$-th order, from the calculated ratios, and controlling the $P_1$-th, $P_2$-th, . . . , and $P_{N_B}$-th order demodulators and the second P/S transformer by the determined orders;

a second de-interleaver for de-interleaving the serial data received from the second P/S transformer;

a second channel decoder for decoding the de-interleaved serial data received from the second de-interleaver to correct the errors of the de-interleaved serial data.

11. The mobile communication apparatus as claimed in claim 9, wherein the information producer comprises:

a first channel encoder for encoding the dedicated physical channel signal;

a first interleaver for interleaving the encoding result received from the first channel encoder; and a modulator for modulating the interleaving result received from the first interleaver and outputting the modulation result as the importance information to the basis mapping unit.

12. The mobile communication apparatus as claimed in claim 10, wherein the information producer comprises:

a second channel encoder for encoding the dedicated physical channel signal;

a second interleaver for interleaving the encoding result received from the second channel encoder;

a serial-to-parallel (S/P) transformer for transforming the interleaving result received from the second interleaver into parallel data;

$P_1$-th, $P_2$-th, . . . , and $P_{N_B}$-th order modulators for modulating the parallel data received from the S/P transformer using as many different orders as the effective basis number and outputting the modulation results as the importance information to the basis mapping unit; and a second controller for determining the orders from the effective basis values received from the basis information restorer and controlling the S/P transformer and the $P_1$-th, $P_2$-th, ..., and $P_{N_B}$-th order modulators by the determined orders.

13. The mobile communication apparatus as claimed in claim 10, wherein the $P_1$-th, $P_2$-th, ..., and $P_{N_B}$-th order demodulators perform quadrature amplitude demodulations, and the $P_1$-th, $P_2$-th, ..., and $P_{N_B}$-th order modulators perform quadrature amplitude modulations.

14. The mobile communication apparatus of claim 10, wherein the $P_1$-th, $P_2$-th, ..., and $P_{N_B}$-th order demodulators perform phase shift keying (PSK) demodulations, and the $P_1$-th, $P_2$-th, ..., and $P_{N_B}$-th order modulators perform PSK modulations.

15. A mobile communication method performed in a mobile communication apparatus having a base station with a first plurality of antennas and a mobile station with a second plurality of antennas, the method comprising:
(a) measuring downlink characteristics of a channel for each combination of the first plurality of antennas and the second plurality of antennas from a signal received from the base station, determining long-term information in which the correlation property of the channel for each combination has been reflected from the measured downlink characteristics, transforming the long-term information into a feedback signal, and transmitting the feedback signal to the base station; and
(b) receiving the feedback signal, restoring the long-term information from the received feedback signal, performing basis mapping and basis transformation on a dedicated physical channel signal using the restored long-term information, adding the basis-mapped and basis-transformed signal to each of a plurality of pilot channel signals, and transmitting the addition results to the mobile station.

16. The mobile communication method as claimed in claim 15, wherein (a) comprises:
(a1) receiving the signal from the base station and spatially measuring the downlink characteristics from the received signal;
(a2) producing basis vectors and basis values from the measured downlink characteristics, calculating an effective basis number indicating the number of effective basis vectors among the basis vectors from the basis values, and determining effective basis vectors and effective basis values as the long-term information; and
(a3) transforming the long-term information into the feedback signal.

17. The mobile communication method as claimed in claim 16, wherein (b) comprises:
(b1) receiving the feedback signal and restoring the long-term information from the feedback signal;
(b2) performing the basis mapping by mapping the dedicated physical channel signal to the effective basis values out of the restored long-term information;
(b3) performing the basis transformation by multiplying the basis-mapping results by the effective basis vectors out of the long-term information; and
(b4) adding the basis-transformation results to the pilot channel signals,
wherein the addition results are transmitted via the antenna array in the base station to the mobile station.

18. The mobile communication method as claimed in claim 17, wherein (a2) comprises:
(a21) producing the basis vectors and the basis values from the measured downlink characteristics using a basis analysis technique;

(a22) determining the number of basis values that exceed a threshold value, as the effective basis number; and
(a23) selecting the effective basis vectors whose number corresponds to the effective basis number from the produced basis vectors and selecting the effective basis values whose number corresponds to the effective basis number from the produced basis values.

19. The mobile communication method as claimed in claim 18, wherein (a21) comprises:
dividing the downlink characteristics to obtain channel vectors associated with the antennas of the antenna array included in the mobile station;
obtaining autocorrelation matrixes for the respective channel vectors;
accumulating each of the autocorrelation matrixes for a predetermined period of time; and
summing the accumulation results and producing the basis vectors and the basis values from the sum the basis analysis technique.

20. The mobile communication method as claimed in claim 18, wherein, in (a), a basis channel is produced by calculating the long-term information and the downlink characteristics, at least two pieces of importance information are detected from the basis channel and received signals received via the antenna array using a multi-antenna information detection technique, and information received from the base station is interpreted from the importance information, and, in (b), at least two pieces of importance information are produced by dividing the dedicated physical channel signal and performing the basis mapping and basis transformation on the importance information using the long-term information.

21. The mobile communication method as claimed in claim 20, wherein, after (a3), (a) further comprises:
(a4) producing the basis channel C by calculating the long-term information and the $$C = H[\sqrt{I_1} v_1 \sqrt{I_2} v_2 \ldots \sqrt{I_{N_B}} v_{N_B}]$$

downlink characteristics H as follows:
wherein $v_1$ through $v_{N_B}$ denote the effective basis vectors, $I_1$ through $I_{N_B}$ denote the effective basis values, and $N_B$ denotes the effective basis number;
(a5) detecting the importance information from the received signals and the basis channel C using the multi-antenna information detection technique; and
(a6) interpreting information received from the base station using the detected importance information.

22. The mobile communication method as claimed in claim 21, wherein (b) further comprises dividing the dedicated physical channel signal to produce the importance information, after (b1), and proceeding to (b2), in which the importance information produced in (b) are mapped to the effective basis values.

23. The mobile communication method as claimed in claim 22, wherein (a6) comprises:
demodulating the importance information detected in (a5);
de-interleaving the demodulation results;
transforming the de-interleaving results into serial data; and
correcting the errors of the serial data.

24. The mobile communication method as claimed in claim 22, wherein (a6) comprises:
demodulating the importance information detected in (a5) using different orders;
transforming the demodulation results into serial data;
de-interleaving the serial data; and decoding the de-interleaved serial data to correct errors of the de-interleaved serial data, wherein the different orders are determined from ratio between the effective basis values determined in the step (a2).

25. The mobile communication method as claimed in claim 23, wherein (b5) comprises:

encoding the dedicated physical channel signal, after (b1); interleaving the encoding result; and modulating the interleaving result to obtain the importance information and proceeding to (b2).

26. The mobile communication method as claimed in claim 24, wherein (b5) comprises:

encoding the dedicated physical channel signal, after (b1); interleaving the encoding result;

transforming the interleaving result into parallel data; and modulating the parallel data using different orders to obtain the importance information and proceeding to (b2), wherein the orders are determined from the ratios between the effective basis values out of the long-term information restored in (b1).

27. A mobile station having a plurality of antennas, the mobile station measuring downlink characteristics of a channel for each combination of the plurality of antennas and antennas in a base station from a signal received from the base station, determining long-term information in which a correlation property of the channel for each combination has been reflected from the measured downlink characteristics, transforming the long-term information into a feedback signal, and transmitting the feedback signal to the base station, the mobile station comprising:

means for receiving the signal from the base station;

means for spatially measuring the downlink characteristics from the received signal;

means for producing basis vectors and basis values from the measured downlink characteristics;

means for calculating an effective basis number, which indicates the number of effective basis vectors among the basis vectors, from the basis values;

means for determining effective basis vectors and effective basis values as the long-term information; and means for transforming the long-term information received from the mobile station long-term information determiner into the feedback signal.

* * * * *